US012762343B2

(12) United States Patent
Lee et al.

(10) Patent No.: US 12,762,343 B2
(45) Date of Patent: Oct. 13, 2026

(54) STRUCTURAL ENCODING AND ATTENTION PARADIGMS FOR SEQUENCE MODELING

(71) Applicant: Google LLC, Mountain View, CA (US)

(72) Inventors: Chen-Yu Lee, Santa Clara, CA (US); Chun-Liang Li, Mountain View, CA (US); Timothy Dozat, Mountain View, CA (US); Vincent Perot, Brooklyn, NY (US); Guolong Su, State College, PA (US); Nan Hua, Palo Alto, CA (US); Joshua Ainslie, Brentwood, TN (US); Renshen Wang, Santa Clara, CA (US); Yasuhisa Fujii, San Mateo, CA (US); Tomas Pfister, Redwood City, CA (US)

(73) Assignee: GOOGLE LLC, Mountain View, CA (US)

( * ) Notice: Subject to any disclaimer, the term of this patent is extended or adjusted under 35 U.S.C. 154(b) by 180 days.

(21) Appl. No.: 18/684,557

(22) PCT Filed: Aug. 25, 2021

(86) PCT No.: PCT/US2021/047461
§ 371 (c)(1),
(2) Date: Feb. 16, 2024

(87) PCT Pub. No.: WO2023/027701
PCT Pub. Date: Mar. 2, 2023

(65) Prior Publication Data

US 2024/0354504 A1 Oct. 24, 2024

(51) Int. Cl.

*G06V 30/10* (2022.01)
*G06F 40/284* (2020.01)
*G06V 30/416* (2022.01)

(52) U.S. Cl.
CPC ............ *G06F 40/284* (2020.01); *G06V 30/10* (2022.01); *G06V 30/416* (2022.01)

(58) Field of Classification Search
CPC .... G06F 40/284; G06F 40/30; G06F 16/3344; G06F 40/295; G06V 30/268;
(Continued)

(56) References Cited

U.S. PATENT DOCUMENTS

2023/0129874 A1* 4/2023 Torres .................... G06N 3/045
704/9

FOREIGN PATENT DOCUMENTS

CN 112464781 3/2021
WO 2023027701 A1 3/2023

OTHER PUBLICATIONS

Zuo et. al, "Context-Specific Heterogeneous Graph Convolutional Network for Implicit Sentiment Analysis" (Year: 2020).*
(Continued)

*Primary Examiner* — Andrew W Bee
(74) *Attorney, Agent, or Firm* — Gray Ice Higdon

(57) ABSTRACT

Systems and methods for providing a structure-aware sequence model that can interpret a document's text without first inferring the proper reading order of the document. In some examples, the model may use a graph convolutional network to generate contextualized "supertoken" embeddings for each token, which are then fed to a transformer that employs a sparse attention paradigm in which attention weights for at least some supertokens are modified based on differences between predicted and actual values of the order and distance between the attender and attendee supertokens.

20 Claims, 7 Drawing Sheets

(58) Field of Classification Search
CPC .... G06V 30/10; G06V 30/413; G06V 30/416; G06V 10/82; G06N 3/0464; G06N 20/00
See application file for complete search history.

(56) References Cited

OTHER PUBLICATIONS

Xu et. al, "LayoutLM: Pre-training of Text and Layout for Document Image Understanding" (Year: 2020).*
Wei et. al, "Masked Conditional Random Fields for Sequence Labeling," Mar. 2021.*
Shaw et. al, "Self-Attention with Relative Position Representations" (Year: 2018).*
Intellectual Property India, Examination Report issued in Application No. 202417009380, 7 pages, dated Dec. 4, 2025.
Zuo, E. et al.; Context-Specific Heterogeneous Graph Convolution Network for Implicit Sentiment Analysis, IEEE Access, 9 pages, dated Feb. 1, 2020.
Li, Yujia , et al., "Graph Matching Networks for Learning the Similarity of Graph Structured Objects", Proceedings of the 36 th International Conference on Machine Learning, Long Beach, California, PMLR 97, 2019., arXiv:1904.12787v2 [cs.LG] May 12, 2019, 18 pages.
Li, Yulin , et al., "StrucTexT: Structured Text Understanding with Multi-Modal Transformers", MM '21, Oct. 20-24, 2021, Virtual Event, China, arXiv:2108.02923v3 [cs.CV] Nov. 8, 2021, 9 pages.
Lin, Tsung-Yi , et al., "Feature Pyramid Networks for Object Detection", CVPR paper is the Open Access version, provided by the Computer Vision Foundation, Dec. 2016, pp. 2117-2125.
Lin, Weihong , et al., "ViBERTgrid: a Jointly Trained Multi-Modal 2D Document Representation for Key Information Extraction from Documents", 2021, 16 pages.
Liu, Yinhan , RoBERTa: a Robustly Optimized BERT Pretraining Approach, arXiv:1907.11692v1, Jul. 26, 2019, pp. 1-13.
Liu, Xiaojing , et al., "Graph convolution for multimodal information extraction from visually rich documents", arXiv:1903.11279v1 [cs.IR] Mar. 27, 2019, 8 pp.
Luong, Minh-Thang , et al., "Logical structure recovery in scholarly articles with rich document features", Multimedia Storage and Retrieval Innovations for Digital Library Systems, 2012, 25 pp.
Majumder, Bodhisattwa Prasad, et al., "Representation Learning for Information Extraction from Form-like Documents", Proceedings of the 58th Annual Meeting of the Association for Computational Linguistics, pp. 6495-6504, Jul. 5-10, 2020.
Marinai, Simone , et al., "Artificial Neural Networks for Document Analysis and Recognition", IEEE Transactions on pattern analysis and machine intelligence, vol. 27, Issue: 1, Jan. 2005, 45 pp.
O'Gorman, Lawrence , "The document spectrum for page layout analysis", IEEE Transactions on pattern analysis and machine intelligence, 1993, 12 pp.
Palm, Rasmus Berg, et al., "CloudScan—a configuration-free invoice analysis system using recurrent neural networks", arXiv:1708.07403v1 [cs.CL] Aug. 24, 2017, 8 pages.
Park, Seunghyun , et al., "CORD: a Consolidated Receipt Dataset for Post-OCR Parsing", 33rd Conference on Neural Information Processing Systems (NeurIPS 2019), Vancouver, Canada, 4 pages.
Parmar, Niki , et al., "Image Transformer", In International Conference on Machine Learning (ICML)., 2018, 10 pp.
Peng, Nanyun , et al., "Cross-sentence N-ary relation extraction with graph Istms", Transactions of the Association for Computational Linguistics (TACL), 2017, 16 pp.
Powalski, Rafal , et al., "Going Full-TILT Boogie on Document Understanding with Text-Image-Layout Transformer", arXiv:2102.09550v3 [cs.CL] Jul. 12, 2021, 18 pages.
Pramanik, Subhojeet , et al., "Towards a Multi-modal, Multi-task Learning based Pre-training Framework for Document Representation Learning", arXiv:2009.14457v2 [cs.CL] Jan. 5, 2022, 11 pages.
Qian, Yujie , et al., "GraphIE: a graph-based framework for information extraction", arXiv:1810.13083v3 [cs.CL], Apr. 5, 2019, 12 pp.
Raffel, Colin , et al., "Exploring the Limits of Transfer Learning with a Unified Text-to-Text Transformer", Journal of Machine Learning Research 21 (2020), arXiv:1910.10683v3 [cs.LG] Jul. 28, 2020, pp. 1-67.
Ratinov, Lev , et al., "Design Challenges and Misconceptions in Named Entity Recognition", Proceedings of the Thirteenth Conference on Computational Natural Language Learning (CoNLL), pp. 147-155, Boulder, Colorado, Jun. 2009.
Ren, Shaoqing , et al., "Faster R-CNN: Towards Real-Time Object Detection with Region Proposal Networks", Microsoft Research, 2015, 9 pages.
Russakovsky, Olga , et al., "ImageNet Large Scale Visual Recognition Challenge", arXiv:1409.0575v3 [cs.CV] Jan. 30, 2015, 43 pages.
Schuster, Daniel , et al., "Intellix-end-user trained information extraction for document archiving", In International Conference on Document Analysis and Recognition (ICDAR), 2013, 5 pp.
Shaw, Peter , et al., "Self-attention with relative position representations", arXiv:1803.02155v2 [cs.CL] Apr. 12, 2018, 5 pp.
Shi, Lei , et al., "Contrastive Visual-Linguistic Pretraining", arXiv:2007.13135v1 [cs.CV] Jul. 26, 2020, 11 pp.
Shilman, Michael , et al., "Learning nongenerative grammatical models for document analysis. In International Conference on Computer Vision (ICCV)", In International Conference on Computer Vision (ICCV), 2005, 7 pp.
Simon, Anikó , et al., "A Fast Algorithm for Bottom-up Document Layout Analysis", IEEE Transactions on Pattern Analysis and Machine Intelligence, vol. 19, No. 3, Mar. 1997, pp. 273-277.
Simon, Anikó , et al., "A fast algorithm for bottom-up document layout analysis", IEEE Transactions on Pattern Analysis and Machine Intelligence, vol. 19, Issue: 3, Mar. 1997, 5 pp.
Sohn, Kihyuk , "Improved Deep Metric Learning with Multi-class N-pair Loss Objective", 30th Conference on Neural Information Processing Systems (NIPS 2016), Barcelona, Spain, 9 pages.
Song, Linfeng , "N-ary relation extraction using graph state Istm", arXiv:1808.09101v1 [cs.CL] Aug. 28, 2018, 10 pp.
Soto, Carlos , et al., "Visual detection with context for document layout analysis", Proceedings of the 2019 Conference on Empirical Methods in Natural Language Processing and the 9th International Joint Conference on Natural Language Processing, Nov. 2019, 7 pp.
Sutskever, Ilya , et al., Sequence to Sequence Learning with Neural Networks, arXiv:1409.3215v3, Dec. 14, 2014.
Tan, Hao , et al., LXMERT: Learning Cross-Modality Encoder Representations from Transformers, Proceedings of the 2019 Conference on Empirical Methods in Natural Language Processing and the 9th International Joint Conference on Natural Language Processing, pp. 5100-5111.
Tata, Sandeep , et al., "Glean: Structured Extractions from Templatic Documents", https://storage.googleapis.com/pub-tools-public-publication-data/pdf/95bb94874e93473a281f0a5587393c72ea743bdd.pdf, 2021, 9 pp.
Taylor, Wilson L., "Cloze Procedure": a New Tool for Measuring Readability, Journalism Quarterly, Fall 1953, pp. 415-433.
Van Den Oord, Aaron , et al., "Representation Learning with Contrastive Predictive Coding", arXiv:1807.03748v2 [cs.LG] Jan. 22, 2019, 13 pages.
Vaswani, Ashish , et al., "Attention Is All You Need", arXiv:1706.03762v5, Dec. 6, 2017, pp. 1-15.
Velickovic, Petar , et al., "Deep Graph Infomax", arXiv:1809.10341v2 [stat.ML] Dec. 21, 2018, 17 pages.
Velickovic, Petar , et al., "Node representation learning with Deep Graph Infomax", https://stellargraph.readthedocs.io/en/stable/demos/embeddings/deep-graph-infomax-embeddings.html, retrieved from the Internet Jan. 25, 2023, 9 pp.
Vig, Jesse , "A Multiscale Visualization of Attention in the Transformer Model", Proceedings of the 57th Annual Meeting of the Association for Computational Linguistics: System Demonstrations, pp. 37-42 Florence, Italy, Jul. 28-Aug. 2, 2019.

(56) References Cited

OTHER PUBLICATIONS

Wang, Wenjin , et al., "ERNIE-mmLayout: Multi-grained MultiModal Transformer for Document Understanding", arXiv:2209.08569v1 [cs.CV] Sep. 18, 2022, 10 pages.
Wang, Renshen , et al., "General-Purpose OCR Paragraph Identification by Graph Convolution Networks", arXiv:2101.12741v1 [cs.CV] Jan. 29, 2021, 14 pp.
Wang, Renshen , et al., "General-Purpose OCR Paragraph Identification by Graph Convolutional Neural Networks", arXiv:2101.12741v2 [cs.CV] Feb. 1, 2021, 14 pp.
Wang, Renshen , et al., "General-Purpose OCR Paragraph Identification by Graph Convolutional Neural Networks", arXiv:2101.12741v3 [cs.CV] May 26, 2021, 13 pp.
Wang, Zilong , et al., "LayoutReader: Pre-training of Text and Layout for Reading Order Detection", arXiv:2108.11591v2 [cs.CL] Aug. 27, 2021, 10 pp.
Wang, Jiapeng , et al., "LiLT: a Simple yet Effective Language-Independent Layout Transformer for Structured Document Understanding", arXiv:2202.13669v1 [cs.CL] Feb. 28, 2022, 11 pages.
Wang, Renshen , et al., "Post-OCR Paragraph Recognition by Graph Convolutional Networks", arXiv:2101.12741v4 [cs.CV] Jul. 20, 2021, 13 pp.
Wei, Hao , et al., "Evaluation of svm, mlp and gmm classifiers for layout analysis of historical documents", International Conference on Document Analysis and Recognition, 2013, 5 pp.
Wei, Mengxi , et al., "Robust Layout-aware IE for Visually Rich Documents with Pre-trained Language Models", SIGIR '20, Jul. 25-30, 2020, Virtual Event, China, arXiv:2005.11017v1 [cs.CL] May 22, 2020, 10 pages.
Weijie, Su , et al., "VL-BERT: Pre-Training of Generic Visuallinguistic Representations", arXiv:1908.08530v4 [cs.CV] Feb. 18, 2020, 16 pp.
Wu, Zhanghao , et al., "Representing Long-Range Context for Graph Neural Networks with Global Attention", 35th Conference on Neural Information Processing Systems (NeurIPS 2021), arXiv:2201.08821v1 [cs.LG] Jan. 21, 2022, 14 pages.
The International Search Report and the Written Opinion of the International Searching Authority for International Application No. PCT/US2021/047461, mailed on May 13, 2022, 10 Pages.
Aggarwal, Milan , et al., "Form2Seq : a Framework for Higher-Order Form Structure Extraction", arXiv:2107.04419v1 [cs.LG] Jul. 9, 2021, 11 pages.
Ainslie, Joshua , et al., "ETC: Encoding Long and Structured Inputs in Transformers", arXiv:2004.08483v5 [cs.LG] Oct. 27, 2020, 17 pages.
Anand, Ankesh , "Contrastive Self-Supervised Learning", https://ankeshanand.com/blog/2020/01/26/contrative-self-supervised-learning.html, Jan. 26, 2020, 12 pp.
Antonacopoulos, Apostolos , et al., "A Realistic Dataset for Performance Evaluation of Document Layout Analysis", 10th International Conference on Document Analysis and Recognition, 2009, 5 pp.
Appalaraju, Srikar , et al., "DocFormer: End-to-End Transformer for Document Understanding", arXiv:2106.11539v2 [cs.CV] Sep. 20, 2021, 22 pages.
Bao, Hangbo , et al., "UNILMv2: Pseudo-Masked Language Models for Unified Language Model Pre-Training", arXiv:2002.12804v1 [cs.CL] Feb. 28, 2020, 11 pages.
Chen, Ting , et al., "A Simple Framework for Contrastive Learning of Visual Representations", arXiv:2002.05709v3 [cs.LG] Jul. 1, 2020, 20 pages.
Chiticariu, Laura , et al., "Rule-based Information Extraction is Dead! Long Live Rule-based Information Extraction Systems!", Proceedings of the 2013 Conference on Empirical Methods in Natural Language Processing, pp. 827-832, Seattle, Washington, USA, Oct. 18-21, 2013.
Cosma, Adrian , et al., "Self-Supervised Representation Learning on Document Images", arXiv:2004.10605v2 [cs.CV] May 27, 2020.
Davis, Brian , et al., "Deep Visual Template-Free Form Parsing", arXiv:1909.02576v2 [cs.CV] Sep. 18, 2019, 9 pp.
Davis, Brian , et al., "Visual FUDGE: Form Understanding via Dynamic Graph Editing", arXiv:2105.08194v2 [cs.CV] Jul. 16, 2021, 16 pp.
Denk, Timo I., et al., "BERTgrid: Contextualized Embedding for 2D Document Representation and Understanding", arXiv:1909.04948v2 [cs.CL] Oct. 14, 2019, 4 pages.
Devlin, Jacob , et al., "BERT: Pre-training of Deep Bidirectional Transformers for Language Understanding", arXiv:1810.04805v2 [cd.CL] May 24, 2019, 16 pages.
Dong, Haoyu , et al., "Table Pre-training: a Survey on Model Architectures, Pre-training Objectives, and Downstream Tasks", arXiv:2201.09745v4 [cs.CL], Apr. 29, 2022, 15 pp.
Dosovitskiy, Alexey , et al., "An Image is Worth 16×16 Words: Transformers for Image Recognition at Scale", arXiv:2010.11929v2 [cs.CV] Jun. 3, 2021, Published as a conference paper at ICLR 2021, 22 pages.
Garncarek, Łukasz , et al., "LAMBERT: Layout-Aware (Language) Modeling using BERT for information extraction", arXiv:2002.08087v3 [cs.CL] Apr. 28, 2020, 18 pp.
Garncarek, Łukasz , et al., "LAMBERT: Layout-Aware Language Modeling for Information Extraction", arXiv:2002.08087v4 [cs.CL] Mar. 25, 2021, 15 pp.
Garncarek, Lukasz , et al., "LAMBERT: Layout-Aware Language Modeling for Information Extraction", arXiv:2002.08087v5 [cs.CL] May 28, 2021, 16 pages.
Garncarek, Łukasz , et al., "LAMBERT: Layout-Aware language Modeling using BERT for information extraction", arXiv:2002.08087v1 [cs.CL] Feb. 19, 2020, 9 pp.
Garncarek, Łukasz , et al., "LAMBERT: Layout-Aware language Modeling using BERT for information extraction", arXiv:2002.08087v2 [cs.CL] Mar. 6, 2020, 17 pp.
Gilmer, Justin , et al., "Neural Message Passing for Quantum Chemistry", In International Conference on Machine Learning (ICML). 2017, 10 pp.
Gori, Marco , et al., "Artificial Neural Networks for Document Analysis and Recognition", Technical Report N.Jan. 2003 University of Florence, pp. 1-45.
Gu, Jiuxiang , et al., "Unified Pretraining Framework for Document Understanding", 35th Conference on Neural Information Processing Systems (NeurIPS 2021)., arXiv:2204.10939v2 [cs.CL] Apr. 28, 2022, 12 pages.
Gu, Zhangxuan , et al., "XYLayoutLM: Towards Layout-Aware Multimodal Networks for Visually-Rich Document Understanding", 2022, 10 pages.
Gunel, Beliz , et al., "Data-Efficient Information Extraction from Form-Like Documents", arXiv:2201.02647v1 [cs.LG] Jan. 7, 2022, 5 pp.
Ha, Jaekyu , et al., "Recursive X-Y Cut using Bounding Boxes of Connected Components", Proceedings of the Third International Conference on Document Analysis and Recognition (ICDAR '95), pp. 952-955.
Hafidi, Hakim , et al., "GraphCL: Contrastive Self-Supervised Learning of Graph Representations", arXiv:2007.08025v1 [cs.LG], Jul. 15, 2020, 10 pp.
Hassani, Kaveh , et al., "Contrastive Multi-View Representation Learning on Graphs", Proceedings of the 37th International Conference on Machine Learning, Vienna, Austria, PMLR 108, 2020, arXiv:2006.05582v1 [cs.LG] Jun. 10, 2020, 13 pages.
He, Kaiming , et al., "Deep Residual Learning for Image Recognition", arXiv:1512.03385v1 [cs.CV] Dec. 10, 2015, 12 pages.
He, Kaiming , et al., "Mask R-CNN", arXiv:1703.06870v3 [cs.CV] Jan. 24, 2018, 12 pages.
Hirano, Takashi , et al., "Text and Layout Information Extraction from Document Files of Various Formats Based on the Analysis of Page Description Language", International Conference on Document Analysis and Recognition (ICDAR), 2007, 5 pp.
Huang, Zheng , et al., "ICDAR2019 Competition on Scanned Receipt OCR and Information Extraction", arXiv:2103.10213v1 [cs.AI] Mar. 18, 2021, 6 pages.
Huang, Yupan , et al., "LayoutLMv3: Pre-training for Document AI with Unified Text and Image Masking", arXiv:2204.08387v3 [cs.CL] Jul. 19, 2022, 10 pages.

(56) References Cited

OTHER PUBLICATIONS

Hwang, Wonseok , et al., "Post-ocr parsing: building simple and robust parser via bio tagging", In Workshop on Document Intelligence at NeurIPS 2019.
Hwang, Wonseok , et al., "Spatial Dependency Parsing for 2D Document Understanding", arXiv:2005.00642v1 [cs.CL] May 1, 2020, 9 pp.
Hwang, Wonseok , et al., "Spatial Dependency Parsing for Semi-Structured Document Information Extraction", arXiv:2005.00642v2 [cs.CL] Sep. 30, 2020, 13 pp.
Hwang, Wonseok , et al., "Spatial Dependency Parsing for Semi-Structured Document Information Extraction", arXiv:2005.00642v3 [cs.CL] Jul. 1, 2021, 14 pages.
Jaume, Guillaume , et al., "FUNSD: a Dataset for Form Understanding in Noisy Scanned Documents", arXiv:1905.13538v2 [cs.IR] Oct. 29, 2019, 6 pages.
Katti, Anoop R., et al., "Chargrid: Towards Understanding 2D Documents", arXiv:1809.08799v1 [cs.CL] Sep. 24, 2018, Published as a conference paper at EMNLP 2018, 11 pages.
Kim, Geewook , et al., "OCR-free Document Understanding Transformer", arXiv:2111.15664v5 [cs.LG] Oct. 6, 2022, 29 pages.
Lebourgeois, Frank , et al., "A Fast and Efficient Method for Extracting Text Paragraphs and Graphics from Unconstrained Documents", Conference Paper • Jan. 1992, DOI: 10.1109/ICPR.1992.201771 • Source: IEEE Xplore, 5 pages.
Lee, Chen-Yu , et al., "FormNet: Structural Encoding beyond Sequential Modeling in Form Document Information Extraction", arXiv:2203.08411v2 [cs.CL] Mar. 24, 2022, 20 pages.
Lee, Chen-Yu , et al., "ROPE: Reading Order Equivariant Positional Encoding for Graph-based Document Information Extraction", arXiv:2106.10786v1 [cs.CL] Jun. 21, 2021, 8 pages.
Lewis, D. , et al., "Building a Test Collection for Complex Document Information Processing", SIGIR '06, Aug. 6-9, 2006, Seattle, Washington, USA.
Li, Junlong , et al., "DIT: Self-supervised Pre-training for Document Image Transformer", In Proceedings of the 30th ACM International Conference on Multimedia (MM '22), arXiv:2203.02378v3 [cs.CV] Jul. 19, 2022, 10 pages.
Li, Minghao , et al., "DocBank: a Benchmark Dataset for Document Layout Analysis", arXiv:2006.01038v3 [cs.CL] Nov. 11, 2020, 12 pp.
Li, Junlong , "MarkupLM: Pre-training of Text and Markup Language for Visually Rich Document Understanding", arXiv:2110.08518v2 [cs.CL], Mar. 11, 2022.
Li, Peizhao , et al., "SelfDoc: Self-Supervised Document Representation Learning", arXiv:2106.03331v1 [cs.CV] Jun. 7, 2021, 10 pages.
Wu, Zhirong , et al., "Unsupervised Feature Learning via Non-Parametric Instance Discrimination", arXiv:1805.01978v1 [cs.CV] May 5, 2018, 10 pages.
Xu, Yiheng , et al., "LayoutLM: Pre-training of Text and Layout for Document Image Understanding", arXiv:1912.13318v5 [cs.CL] Jun. 16, 2020, 9 pages.
Xu, Yang, et al., "LayoutLMv2: Multi-modal Pre-training for Visually-rich Document Understanding", arXiv:2012.14740v4 [cs.CL] Jan. 10, 2022, 13 pages.
Xu, Yiheng , et al., "LayoutXLM: Multimodal Pre-training for Multilingual Visually-rich Document Understanding", arXiv:2104.08836v3 [cs.CL], Sep. 9, 2021, 10 pages.
Yang, Xiao , et al., "Learning to extract semantic structure from documents using multimodal fully convolutional neural networks", Conference on Computer Vision and Pattern Recognition, 2017, 10 pp.
Yen-Chun, Chen , et al., "UNITER: UNiversal Image-TExt Representation Learning", arXiv:1909.11740v3 [cs.CV] Jul. 17, 2020, 26 pp.
Yin, Yihang , et al., "AutoGCL: Automated Graph Contrastive Learning via Learnable View Generators", arXiv:2109.10259v2 [cs.LG], Jan. 2, 2022, 12 pp.
You, Yuning , et al., "Graph Contrastive Learning Automated", arXiv:2106.07594v2 [cs.LG], Jun. 10, 2021, 12 pp.
You, Yuning , et al., "Graph Contrastive Learning with Augmentations", 34th Conference on Neural Information Processing Systems (NeurIPS 2020), Vancouver, Canada, 12 pages.
Yu, Wenwen , et al., "Pick: processing key information extraction from documents using improved graph learning-convolutional networks", arXiv:2004.07464v3 [cs.CV], Jul. 18, 2020, 8 pp.
Zaheer, Manzil , et al., "Big bird: Transformers for longer sequences", Advances in neural information processing systems (NeurIPS)., 2020, 15 pp.
Zhang, Yifei , et al., "COSTA: Covariance-Preserving Feature Augmentation for Graph Contrastive Learning", arXiv:2206.04726v2 [cs.LG] Jun. 13, 2022, 18 pp.
Zhang, Shi-Xue , et al., "Deep relational reasoning graph network for arbitrary shape text detection", Conference on Computer Vision and Pattern Recognition (CVPR), 2020, 10 pp.
Zhang, Yue, et al., "Entity Relation Extraction as Dependency Parsing in Visually Rich Documents", arXiv:2110.09915v1 [cs.CL] Oct. 19, 2021, 10 pp.
Zhang, Kaixuan , et al., "Information extraction from text regions with complex tabular structure", Conference on Neural Information Processing Systems, 2019, 4 pp.
Zhao, Xiaohui , et al., "CUTIE: Learning to Understand Documents with Convolutional Universal Text Information Extractor", arXiv:1903.12363v1 [cs.CV] Mar. 29, 2019, 9 pages.
Zhong, Xu , et al., "PubLayNet: largest dataset ever for document layout analysis", arXiv:1908.07836v1 [cs.CL] Aug. 16, 2019, 8 pages.
Zhu, Yanqiao , et al., "An Empirical Study of Graph Contrastive Learning", arXiv:2109.01116v2 [cs.LG] Oct. 26, 2021, 25 pages.
Zhu, Yanqiao , et al., "Awesome Self-Supervised Learning for Graphs", https://github.com/SXKDZ/awesome-self-supervised-learning-for-graphs#awesome-self-supervised-learning-for-graphs, Nov. 1, 2021, 9 pp.
Zhu, Yanqiao , et al., "Deep Graph Contrastive Representation Learning", 2020, 9 pages.
Zhu, Yanqiao , et al., "Deep Graph Contrastive Representation Learning", airXiv:2006.04131v2 [cs.LG] Jul. 13, 2020, 17 pages.
Zhu, Yanqiao , et al., "Deep Graph Contrastive Representation Learning", Arxiv.org, Cornell University Library, 201 Olin Library Cornell University Ithaca, NY 14853, Jul. 3, 2020, XP081711805.
Zuo, Enguang , et al., "Context-Specific Heterogeneous Graph Convolutional Network for Implicit Sentiment Analysis", IEEE Access, vol. 8, Feb. 2020, pp. 37967-37975.

* cited by examiner

100

300

400

500

700

STRUCTURAL ENCODING AND ATTENTION PARADIGMS FOR SEQUENCE MODELING

CROSS-REFERENCE TO RELATED APPLICATIONS

The present application is a national phase entry under 35 U.S.C. § 371 of International Application No. PCT/US21/47461, filed Aug. 25, 2021, published in English, the entire disclosure of which is incorporated herein by reference.

BACKGROUND

Advances in natural language processing and sequence modeling continue to improve the ability of language models to parse and understand information gathered from different types of documents. However, to meaningfully learn from any document, the model must either know or be able to accurately infer the order of (or "serialize") the words in the document. For a simple document consisting of only a single block of text, properly serializing the text may only require a "left-to-right, top-to bottom" approach in which each word is collected by moving from left to right across the first line, and then moving down to the next line. However, for documents with more complicated forms (e.g., marketing documents; advertisements; menus; photographs of signs; documents where text is organized into columns and/or tables; documents where text is broken up and/or wrapped around pictures), properly serializing the text can be more challenging, and may thus adversely impact the language model's ability to draw conclusions and derive meaningful information from that text.

BRIEF SUMMARY

The present technology concerns systems and methods for providing a structure-aware sequence model that can interpret a document's text without first inferring the proper reading order of the document. In some aspects of the technology, the model uses a graph convolutional network ("GCN") to generate contextualized "supertoken" embeddings for each token, and feeds them to a transformer that employs a sparse attention paradigm in which attention weights for at least some supertokens are modified based on differences between predicted and actual values of the order and distance between the attender and attendee supertokens. In some aspects of the technology, the transformer may use an extended transformer construction ("ETC") with a sparse global-local attention mechanism, or another model architecture adapted to long-sequences which employs a similar sparse attention paradigm (e.g., BigBird). Through the incorporation of GCN-generated supertokens, the structure-aware sequence models of the present technology can explicitly preserve local syntactic information that may otherwise be missed in the local attention calculations (e.g., for "long-long" pairings in ETC and BigBird) for a sequence that has not been properly serialized. In addition, by removing the need for the sequence model to correctly infer the reading layout of the input document, the present technology may reduce both the size of the models needed, and the amount of training required, to obtain (or exceed) state-of-the-art performance. The systems and methods disclosed herein may thus be used to enhance the extraction and classification of text from images containing text in non-standard layouts, such as forms, marketing documents, menus, photographs or the like.

In one aspect, the disclosure describes a processing system comprising: a memory storing a neural network comprising a graph convolutional network and a transformer; and one or more processors coupled to the memory and configured to classify text from a given document, comprising: (a) generating a beta-skeleton graph based on a plurality of tokens, each given token of the plurality of tokens corresponding to a given string of text in the given document, and wherein the beta-skeleton graph comprises, for each given token: (i) a node corresponding to the given token and comprising a vector based on content and location of the given string of text within the given document; and (ii) one or more edges, each edge of the one or more edges linking the node corresponding to the given token to a neighboring node corresponding to another token of the plurality of tokens; (b) generating, using the graph convolutional network, a plurality of supertokens based on the beta-skeleton graph, each given supertoken of the plurality of supertokens being based at least in part on the vector of a given node and the vector of each neighboring node to which the given node is linked via one of its one or more edges; (c) generating, using the transformer, a plurality of predictions based on the plurality of supertokens; and (d) generating a set of classifications based on the plurality of predictions, the set of classifications identifying at least one entity class corresponding to at least one token of the plurality of tokens. In some aspects, generating the plurality of predictions based on the plurality of supertokens using the transformer comprises, for a given attender supertoken and a given attendee supertoken: generating a first prediction regarding how the given attender supertoken and given attendee supertoken should be ordered if the given attender supertoken and given attendee supertoken are related to one another; generating a second prediction regarding how far the given attender supertoken should be from the given attendee supertoken if the given attender supertoken and given attendee supertoken are related to one another; generating a first error value based on the first prediction and a value based on how text corresponding to the given attender supertoken and given attendee supertoken is actually ordered in the given document;

generating a second error value based on the second prediction and a value based on how far text corresponding to the given attender supertoken actually is from text corresponding to the given attendee supertoken in the given document; generating a query vector based on the given attender supertoken; generating a key vector based on the given attendee supertoken; generating a first attention score based on the query vector and the key vector; and generating a second attention score based on the first attention score, the first error value, and the second error value. In some aspects, the beta-skeleton graph further comprises, for each given token: a given edge embedding corresponding to each given edge of the one or more edges, the given edge embedding being based on a spatial relationship in the given document between the given token and a token corresponding to the neighboring node to which the given edge is linked. In some aspects, the transformer is configured to use a sparse global-local attention paradigm. In some aspects, the transformer is based on an Extended Transformer Construction architecture. In some aspects, the given document comprises an image of a document, and the one or more processors are further configured to identify, for each given token of the plurality of tokens, the content and location of the given string of text in the given document to which the given token corresponds. In some aspects, identifying the content and location of the given string of text in the given document comprises using optical character recognition. In some aspects, generating the set of classifications based on the plurality of predictions comprises performing dynamic processing based on the plurality of predictions. In some aspects, the set of classifications based on the plurality of predictions are BIOES classifications. In some aspects, generating the set of classifications based on the plurality of predictions comprises performing dynamic processing based on the plurality of predictions to determine a Viterbi path representing an optimal combination of BIOES types and entity classes that generates the highest overall probability based on the plurality of predictions.

In another aspect, the disclosure describes a processing system comprising: a memory storing a neural network comprising a transformer; and one or more processors coupled to the memory and configured to classify text from a given document, comprising: (a) generating, using the transformer, a plurality of predictions based on a plurality of tokens, each given token of the plurality of tokens corresponding to a given string of text in the given document, and wherein generating a given prediction of the plurality of predictions for a given attender token and a given attendee token of a plurality of tokens comprises: (i) generating a first prediction regarding how the given attender token and given attendee token should be ordered if the given attender token and given attendee token are related to one another; (ii) generating a second prediction regarding how far the given attender token should be from the given attendee token if the given attender token and given attendee token are related to one another; (iii) generating a first error value based on the first prediction and a value based on how the text corresponding to the given attender token and given attendee token is actually ordered in the given document; (iv) generating a second error value based on the second prediction and a value based on how far the text corresponding to the given attender token actually is from the text corresponding to the given attendee token in the given document; (v) generating a query vector based on the given attender token; (vi) generating a key vector based on the given attendee token; (vii) generating a first attention score based on the query vector and the key vector; (viii) generating a second attention score based on the first attention score, the first error value, and the second error value; and (ix) generating the given prediction based at least in part on the second attention score; and (b) generating a set of classifications based on the plurality of predictions, the set of classifications identifying at least one entity class corresponding to at least one token of the plurality of tokens. In some aspects, the neural network further comprises a graph convolutional network, and the one or more processors are further configured to: (c) generate a beta-skeleton graph based on the plurality of tokens, wherein the beta-skeleton graph comprises, for each given token of the plurality of tokens: (i) a node corresponding to the given token and comprising a vector based on content and location of the given string of text within the given document; and (ii) one or more edges, each edge of the one or more edges linking the node corresponding to the given token to a neighboring node corresponding to another token of the plurality of tokens; and (d) generate, using the graph convolutional network, a plurality of supertokens based on the beta-skeleton graph, each given supertoken of the plurality of supertokens being based at least in part on the vector of a given node and the vector of each neighboring node to which the given node is linked via one of its one or more edges; and, for each given prediction of the plurality of predictions that is generated by the transformer, the given attender token and the given attendee token are each a supertoken of the plurality of supertokens. In some aspects, the beta-skeleton graph further comprises, for each given token: a given edge embedding corresponding to each given edge of the one or more edges, the given edge embedding being based on a spatial relationship in the given document between the given token and a token corresponding to the neighboring node to which the given edge is linked. In some aspects, the transformer is configured to use a sparse global-local attention paradigm. In some aspects, the transformer is based on an Extended Transformer Construction architecture. In some aspects, the given document comprises an image of a document, and the one or more processors are further configured to identify, for each given token of the plurality of tokens, content and location of the given string of text in the given document to which the given token corresponds. In some aspects, identifying the content and location of the given string of text in the given document comprises using optical character recognition. In some aspects, generating the set of classifications based on the plurality of predictions comprises performing dynamic processing based on the plurality of predictions. In some aspects, the set of classifications based on the plurality of predictions are BIOES classifications. In some aspects, generating the set of classifications based on the plurality of predictions comprises performing dynamic processing based on the plurality of predictions to determine a Viterbi path representing an optimal combination of BIOES types and entity classes that generates the highest overall probability based on the plurality of predictions.

DETAILED DESCRIPTION

The present technology will now be described with respect to the following exemplary systems and methods.

Example Systems

Figure 1:
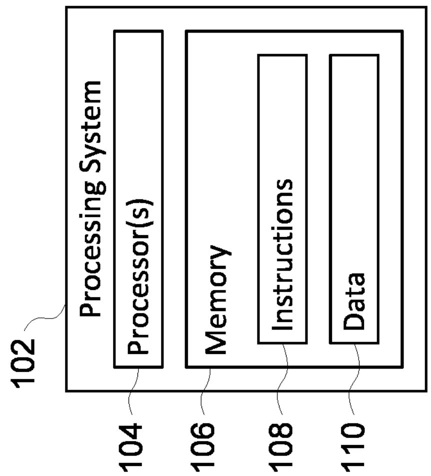
FIG. 1 is a functional diagram of an example system in accordance with aspects of the disclosure.

FIG. 1 shows a high-level system diagram 100 of an exemplary processing system 102 for performing the methods described herein. The processing system 102 may include one or more processors 104 and memory 106 storing instructions 108 and data 110. The instructions 108 and data 110 may include any of the structure-aware sequence models described herein. In addition, the data 110 may store documents and/or training examples to be used in training a sequence model, and/or documents to be used during inference. Processing system 102 may be resident on a single computing device. For example, processing system 102 may be a server, personal computer, or mobile device, and a sequence model may thus be local to that single computing device. Similarly, processing system 102 may be resident on a cloud computing system or other distributed system. In such a case, a sequence model may be distributed across two or more different physical computing devices. For example, in some aspects of the technology, where a sequence model includes both a GCN and a transformer (as discussed further below), the processing system may comprise a first computing device storing the GCN and a second computing device storing the transformer.

Figure 2:
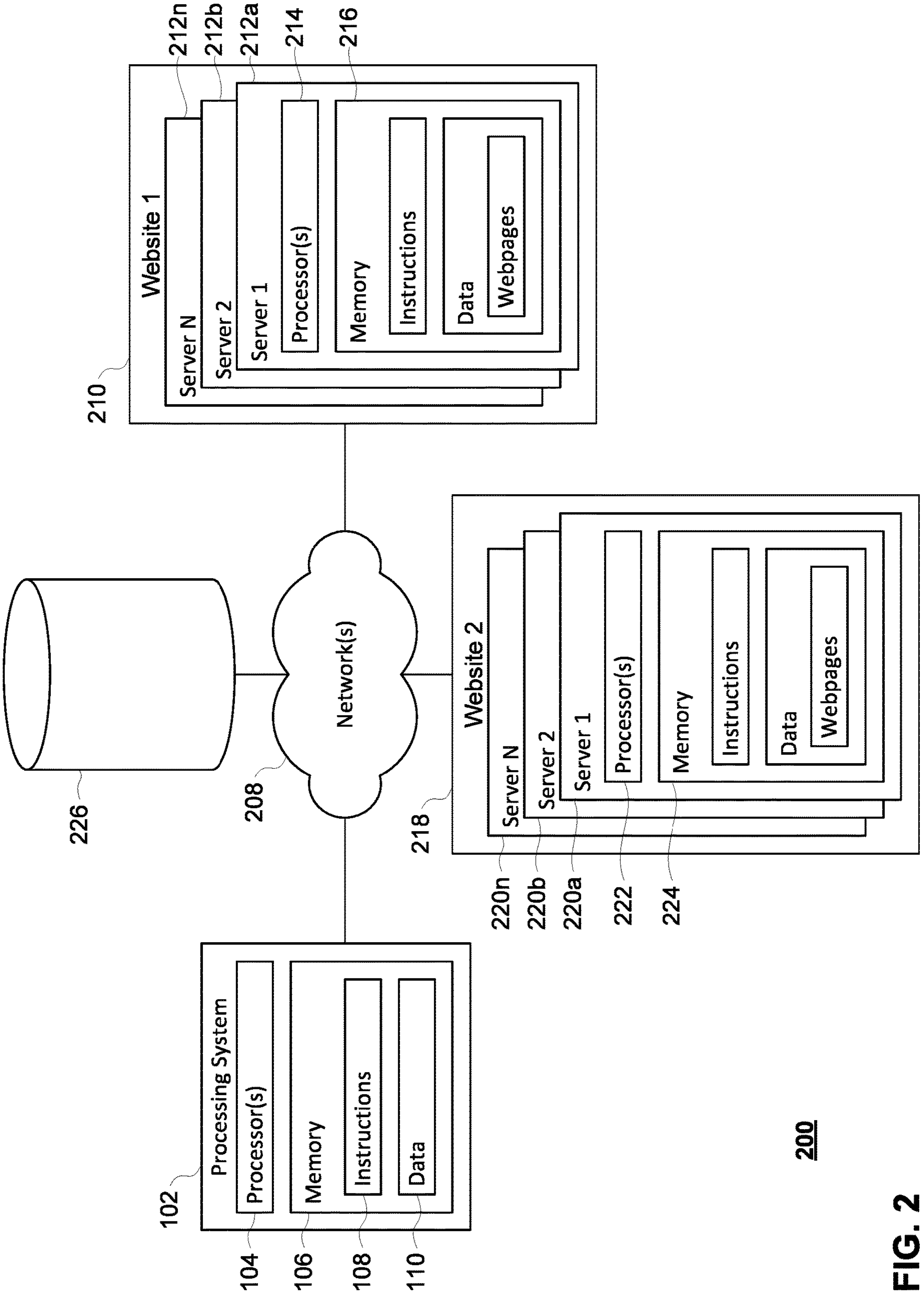
FIG. 2 is a functional diagram of an example system in accordance with aspects of the disclosure.

Further in this regard, FIG. 2 shows a high-level system diagram 200 in which the exemplary processing system 102 just described is shown in communication with various websites and/or remote storage systems over one or more networks 208, including websites 210 and 218 and remote storage system 226. In this example, websites 210 and 218 each include one or more servers 212*a*-212*n* and 220*a*-220*n*, respectively. Each of the servers 212*a*-212*n* and 220*a*-220*n* may have one or more processors (e.g., 214 and 222), and associated memory (e.g., 216 and 224) storing instructions and data, including the content of one or more webpages. Likewise, although not shown, remote storage system 226 may also include one or more processors and memory storing instructions and data. In some aspects of the technology, the processing system 102 may be configured to retrieve documents and/or training data from one or more of website 210, website 218, and/or remote storage system 226 to be provided to a sequence model for training or inference.

The processing systems described herein may be implemented on any type of computing device(s), such as any type of general computing device, server, or set thereof, and may further include other components typically present in general purpose computing devices or servers. Likewise, the memory of such processing systems may be of any non-transitory type capable of storing information accessible by the processor(s) of the processing systems. For instance, the memory may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

In all cases, the computing devices described herein may further include any other components normally used in connection with a computing device such as a user interface subsystem. The user interface subsystem may include one or more user inputs (e.g., a mouse, keyboard, touch screen and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), graphics processing units ("GPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C#, C++, JAVA or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

Example Methods

Figure 3:
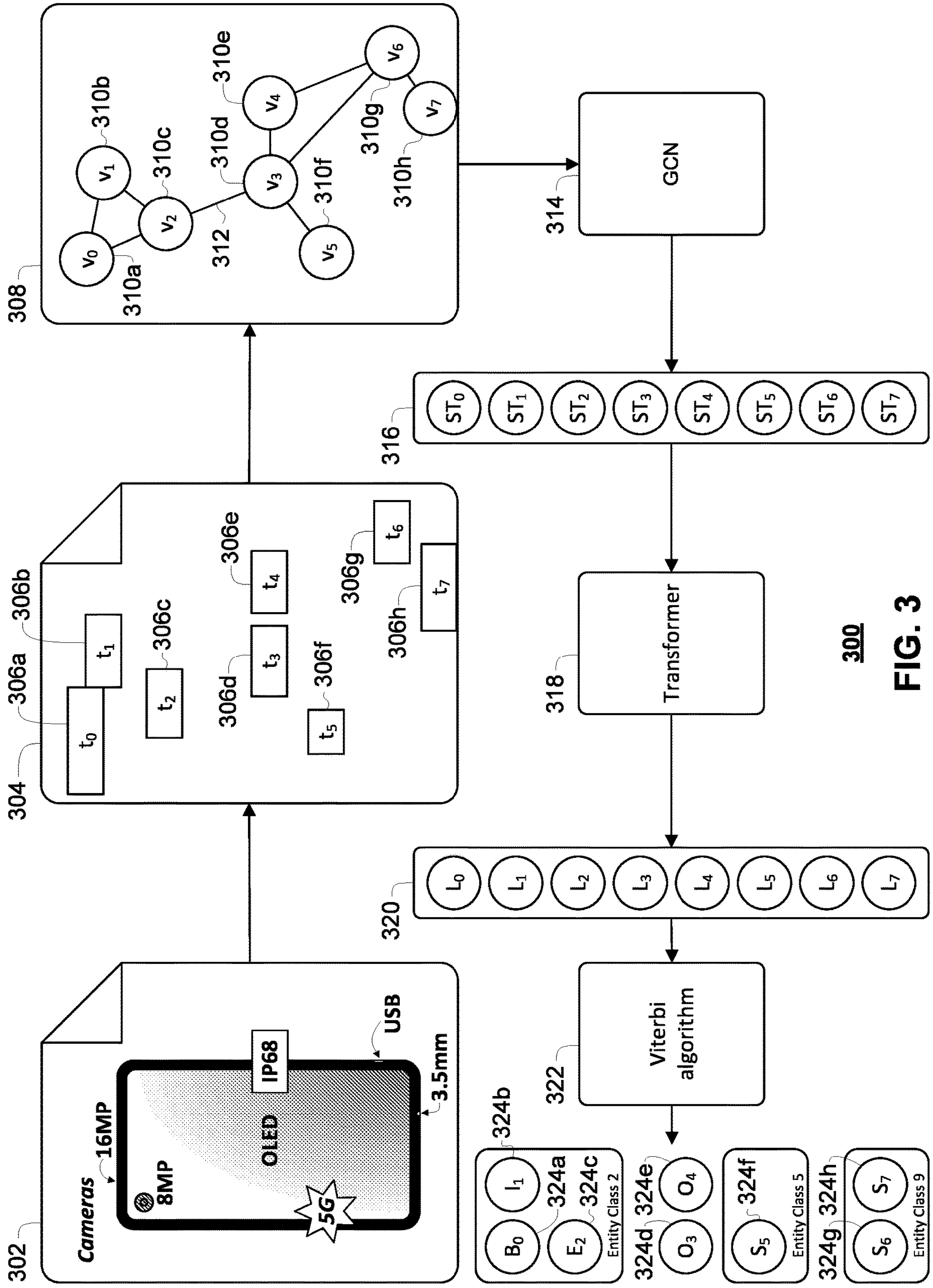
FIG. 3 is a flow diagram illustrating how a structure-aware sequence model may process an exemplary document, in accordance with aspects of the disclosure.

FIG. 3 shows a flow diagram 300 illustrating how a structure-aware sequence model may process an exemplary document 302, in accordance with aspects of the disclosure. In that regard, in the example of FIG. 3, it is assumed that the processing system (e.g., processing system 102) receives a document 302 depicting a smart phone with various features highlighted in text. Specifically, the words "Cameras," "16MP," and "8MP" are listed on or near the top left corner of the smartphone; the word "OLED" is listed within the smartphone's screen; the word "IP68" is shown in a box overlapping the right side of the smartphone's case; the word "5G" is shown in a star overlapping the left side of the smartphone's case; and the words "USB" and "3.5 mm" are listed around the bottom right corner of the smartphone's case.

In this example, the processing system processes document 302 (e.g., an image of a document comprising pixel data) to obtain a listing of the text on the page, and the location of each word, as shown in layout 304. The information represented in layout 304 may be harvested from document 302 in any suitable way. For example, in some aspects of the technology, the processing system may perform optical character recognition ("OCR") on document 302 to identify each word, and its respective position on the page.

In exemplary layout 304, the words of document 302 have each been replaced with numbered tokens (to through $t_7$). In addition, the size and position of each word has been represented with corresponding bounding boxes. Thus, the word "Cameras" is represented in layout 304 as token to and bounding box 306*a*; "16MP" is represented with token $t_1$ and bounding box 306*b*; "8MP" is represented with token $t_2$ and bounding box 306*c*; "OLED" is represented with token $t_3$ and bounding box 306*d*; "IP68" is represented with token ta and bounding box 306*e*; "5G" is represented with token $t_5$ and bounding box 306*f*; "USB" is represented with token to and bounding box 306*g*; and "3.5 mm" is represented with token $t_7$ and bounding box 306*h*. In this example, it has been assumed for the sake of illustration that each of the words of document 302 will translate to a single token. However, in some aspects of the technology, the processing system may be configured to use a wordpiece tokenization paradigm (e.g., the multilingual wordpiece tokenization approach employed by BERT-type transformers), in which certain words may be tokenized into one or more constituent wordpieces. In such a case, one or more words of document 302 may be broken into multiple wordpiece tokens (e.g., "Cameras" may be tokenized into "Camera" and "##s", "16MP" may be tokenized into "16" and "##MP", etc.), each of which would have its own smaller bounding box in layout 304.

Likewise, while the exemplary layout 304 shows each token having a bounding box, any other suitable approach may be used to record the size and position of each token. For example, in some aspects of the technology, each token's size and position on the page may be represented using the coordinates of a single point (e.g., top left corner of the token on the page) combined with the token's height and width. Likewise, in some aspects of the technology, the size and position of the token may be an estimate. For example, if "16MP" is tokenized into "16" and "##MP" ("##" being a suffix token identifier), the processing system may be configured to take the overall width of the word "16MP" and simply divide that overall width evenly for each character such that the width of the individual bounding boxes for "16" and "MP" are both half of the overall width of "16MP." This estimation approach may be used even in cases where the lettering in document 302 is not proportional, and thus the bounding box for "16" would in fact overlap the letter "M" on the page.

The processing system processes layout 304 to generate a beta-skeleton graph 308 in which each token ($t_0$-$t_7$) of the layout 304 is represented as a node (310*a*-310*h*), and each node is connected to one or more nearby nodes with one or more edges (e.g., 312). An exemplary method for generating the nodes and edges of a beta-skeleton graph is set forth below with respect to FIGS. 4 and 5, but any other suitable method for generating a beta-skeleton graph may also be employed.

Each node 310*a*-310*h* of beta-skeleton graph 308 contains a vector ($v_0$-$v_7$) corresponding to the information listed for its corresponding token in layout 304. These beta-skeleton vectors $v_0$-$v_7$ may be based on any suitable combination of the information contained in layout 304 for their respective tokens. For example, the beta-skeleton vector for each token may generated by concatenating a text embedding based on the text of the token, with a spatial embedding based on where the token is located in document 302 (e.g., as represented by the bounding box of layout 304). Thus, assuming that a full-word tokenization paradigm is used such that the text of token to is "Cameras," the beta-skeleton vector $v_0$ corresponding token to may be generated by concatenating a text embedding based on the word "Cameras" and a spatial embedding based on the bounding box for token to in layout 304. Here as well, the spatial embedding may be based on any suitable representation of the token's location, including the coordinates of two corners of the bounding box (e.g., top-left and bottom-right corners), the coordinates of one corner combined with the height and width of the bounding box, etc. Likewise, any suitable learned or static embedding function may be used to generate the text embeddings and spatial embeddings on which the beta-skeleton vectors are based.

In addition, in some aspects of the technology, the beta-skeleton graph 308 may further include an edge embedding for each of the edges extending from the given node in the beta-skeleton graph. In such a case, edge embeddings may be based on any suitable representation of the spatial relationship between the given node and each neighboring node to which it is linked.

Thus, in some aspects of the technology, for a given node A and a neighboring node B, an edge embedding may comprise the distance between one or more common points in the bounding boxes of the tokens to which nodes A and B correspond (e.g., the distance between the centers of each bounding box, between the top-right corners of each bounding box, between the top-left corners of each bounding box, between the bottom right-corners of each bounding box, between the bottom-left corners of each bounding box, etc.). Likewise, in some aspects, an edge embedding for an edge between node A and B may comprise the shortest total distance, shortest vertical distance, and/or the shortest horizontal distance between the bounding boxes of the tokens to which nodes A and B correspond. Likewise, in some aspects, an edge embedding for an edge between node A and B may comprise the coordinates (or coordinates of a given point and associated height and width) of a larger bounding box that encloses the individual bounding boxes of the tokens to which nodes A and B correspond. Likewise, in some aspects, an edge embedding for an edge between node A and B may comprise the aspect ratio of a larger bounding box that would enclose the individual bounding boxes of the tokens to which nodes A and B correspond. Further, in some aspects of the technology, an edge embedding for an edge between node A and B may comprise any combination or subcombination of any of the options just described.

Once beta-skeleton graph 308 has been generated, the processing system will feed the beta-skeleton graph 308 to a graph convolutional network, GCN 314, to generate a set of supertokens 316 corresponding to each node. In some aspects of the technology, the processing system may be configured to provide GCN 314 with both the beta-skeleton graph 308 and layout 304 (or information based thereon representing the tokens in layout 304 and/or their corresponding position on the page), and GCN 314 may be configured to generate the set of supertokens 316 based thereon.

The supertoken corresponding to a given node will be based on the given node's beta-skeleton vector, as well as the beta-skeleton vectors of each node to which it is connected in beta-skeleton graph 308. In addition, in some aspects of the technology, the supertoken corresponding to a given node may further be based on the edge embeddings between the given node and each of these neighboring nodes. Thus, for example, since node 310*a* is connected to nodes 310*b* and 310*c*, the supertoken $ST_1$ corresponding to node 310*a* will be based on beta-skeleton vector $v_0$, as well as the beta-skeleton vectors $v_1$ and $v_2$ of its neighboring nodes. In addition, in some aspects of the technology, the supertoken $ST_1$ corresponding to node 310*a* may further be based on the edge embeddings for the edges between nodes 310*a* and 310*c*, and between nodes 310*a* and 310*b*.

GCN 314 may be configured to generate the supertoken for a given node based on any suitable way of combining the beta-skeleton vectors for the given node and its neighboring nodes. For example, in some aspects of the technology, the supertoken for a given node may be generated by concatenating the beta-skeleton vectors for the given node and its neighboring nodes, and then by further processing the resulting concatenated vector using a multilayer perceptron ("MLP"). Likewise, in some aspects of the technology, the GCN 314 may be configured to further process the concatenated vector using a learned embedding function or another type of feed-forward neural network.

The set of supertokens 316 will be serialized prior to being supplied to transformer 318, and the processing system may be configured to do this using any suitable serialization approach. For example, as shown in FIG. 3, the set of supertokens 316 has been serialized using a left-to-right, top-to-bottom approach based on where each corresponding token is found on layout 304. Likewise, in some aspects of the technology, the set of supertokens may be serialized using a reading order approach. Thus, if the text of document 302 were written in a language where the reading order is right-to-left, top-to-bottom (e.g., as may be true for documents written in Hebrew, Arabic, etc.), the GCN may be configured to serialize the set of supertokens 316 using a right-to-left, top-to-bottom approach based on where each corresponding token is found on layout 304. Likewise, if the text of document 302 were written in a language where reading order is top-to-bottom, right-to-left (e.g., as may be true for documents written in Chinese, Japanese, etc.), the GCN may be configured to serialize the set of supertokens 316 using a top-to-bottom, right-to-left approach based on where each corresponding token is found on layout 304.

The processing system will next process the serialized set of supertokens 316 using a transformer 318. In this example, it is assumed that transformer 318 is configured to employ a sparse attention paradigm, although aspects of the present technology may also be applied to models with transformers that employ traditional (non-sparse) attention paradigms. Thus, for example, in some aspects of the technology, transformer 318 may use an extended transformer construction ("ETC") with a sparse global-local attention mechanism, or another model architecture adapted to long-sequences which similarly employs a sparse attention paradigm (e.g., BigBird).

In addition, it is also assumed in this example that transformer 318 is configured to base local attention scores (e.g., for "long-long" pairings in ETC and BigBird) for a given pair of attender and attendee supertokens at least in part on the difference between predicted and actual values of the order and distance between the attender and attendee supertokens (e.g., using a "Rich Attention" paradigm, as described below with respect to FIG. 7). An exemplary method for modifying local attention scores in this way is explained in more detail below with respect to FIG. 7. However, any other suitable manner of using the order and distance between attender and attendee supertokens to influence local attention scores may be employed by transformer 318. Likewise, in some aspects of the technology, supertokens may be used to improve transformers that are not otherwise configured to modify local attention scores based on the order and distance between attender and attendee supertokens.

In the example of FIG. 3, transformer 318 is configured to output a set of entity BIOES logits 320. Each of these entity BIOES logits $L_0$-$L_7$ represents the model's predictions regarding how likely the corresponding token of layout 304 is to be: (1) the beginning token of a text segment in a recognized entity class; (2) an inside token of a text segment in a recognized entity class; (3) an end token of a text segment in a recognized entity class; (4) a singleton token in a recognized entity class; or (5) an "outside" token that it is not within any recognized entity class.

The processing system processes the set of entity BIOES logits 320 to determine a final prediction of the most likely BIOES type and entity class for the entire set of tokens harvested from layout 304. In the example of FIG. 3, the processing system is configured to make this determination based on a Viterbi algorithm 322 configured to find the "Viterbi path" representing the optimal combination of BIOES types and entity classes that has the highest overall probability. However, any other suitable dynamic processing algorithm may also be used in this regard.

In FIG. 3, the Viterbi algorithm 322's final predictions are represented as 324*a*-324*h*. Specifically, in this example: prediction 324*a* indicates that token to corresponding to the text "Cameras" has been predicted to be a beginning token in Entity Class 2; prediction 324*b* indicates that token $t_1$ corresponding to the text "16MP" has been predicted to be an inside token in Entity Class 2; prediction 324*c* indicates that token $t_2$ corresponding to the text "8MP" has been predicted to be an end token in Entity Class 2; prediction 324*d* indicates that token $t_3$ corresponding to the text "OLED" has been predicted to be an outside token not belonging to any recognized entity class; prediction 324*e* indicates that token $t_4$ corresponding to the text "IP68" has been predicted to be an outside token not belonging to any recognized entity class; prediction 324*f* indicates that token $t_5$ corresponding to the text "5G" has been predicted to be a singleton token in Entity Class 5; prediction 324*g* indicates that token $t_6$ corresponding to the text "USB" has been predicted to be a singleton token in Entity Class 9; and prediction 324*h* indicates that token $t_7$ corresponding to the text "3.5 mm" has been predicted to be a singleton token in Entity Class 9.

Figure 4:
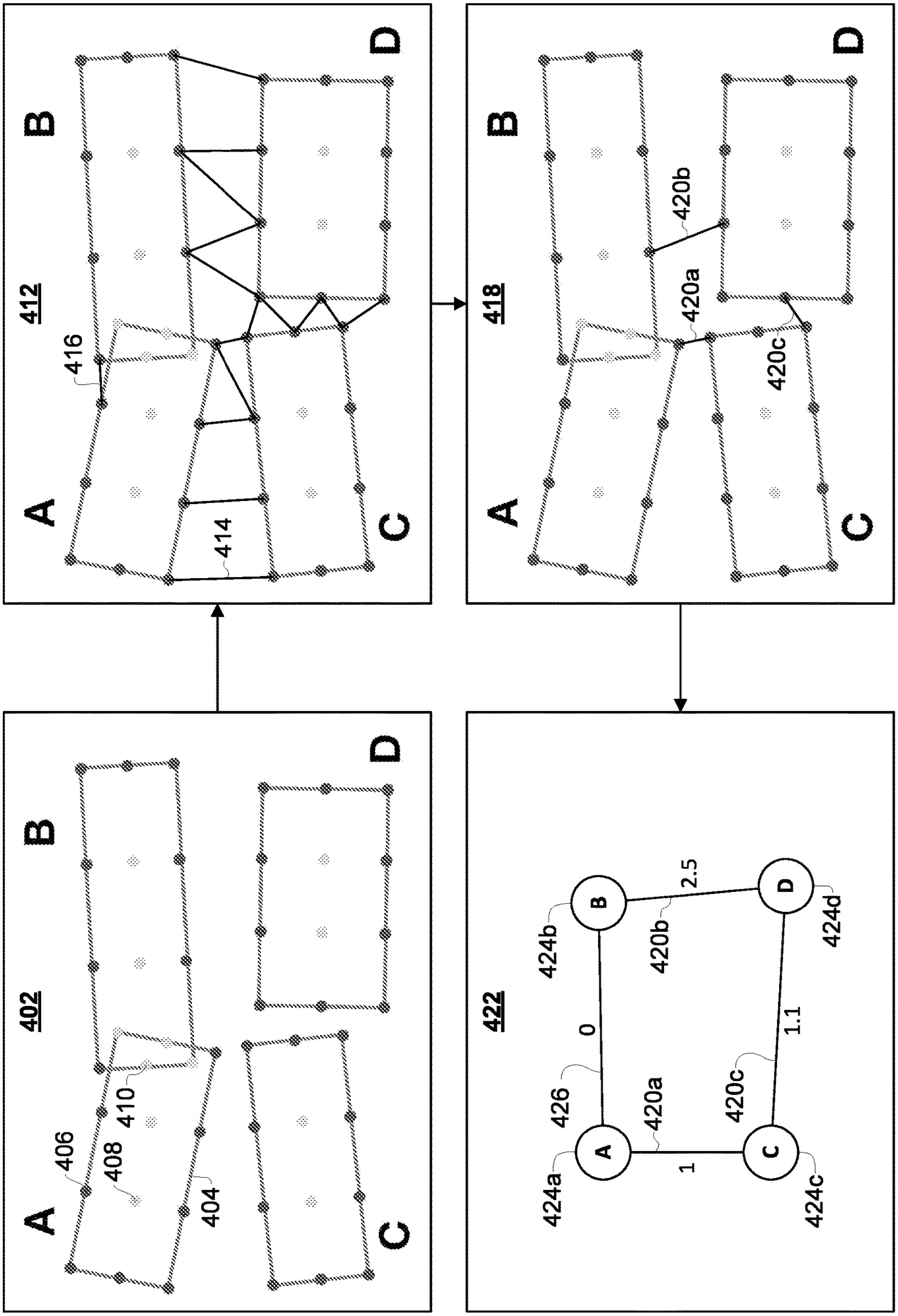
FIG. 4 is a flow diagram illustrating how a set of bounding boxes may be processed in order to generate an exemplary beta-skeleton graph, in accordance with aspects of the disclosure.
Figure 5:
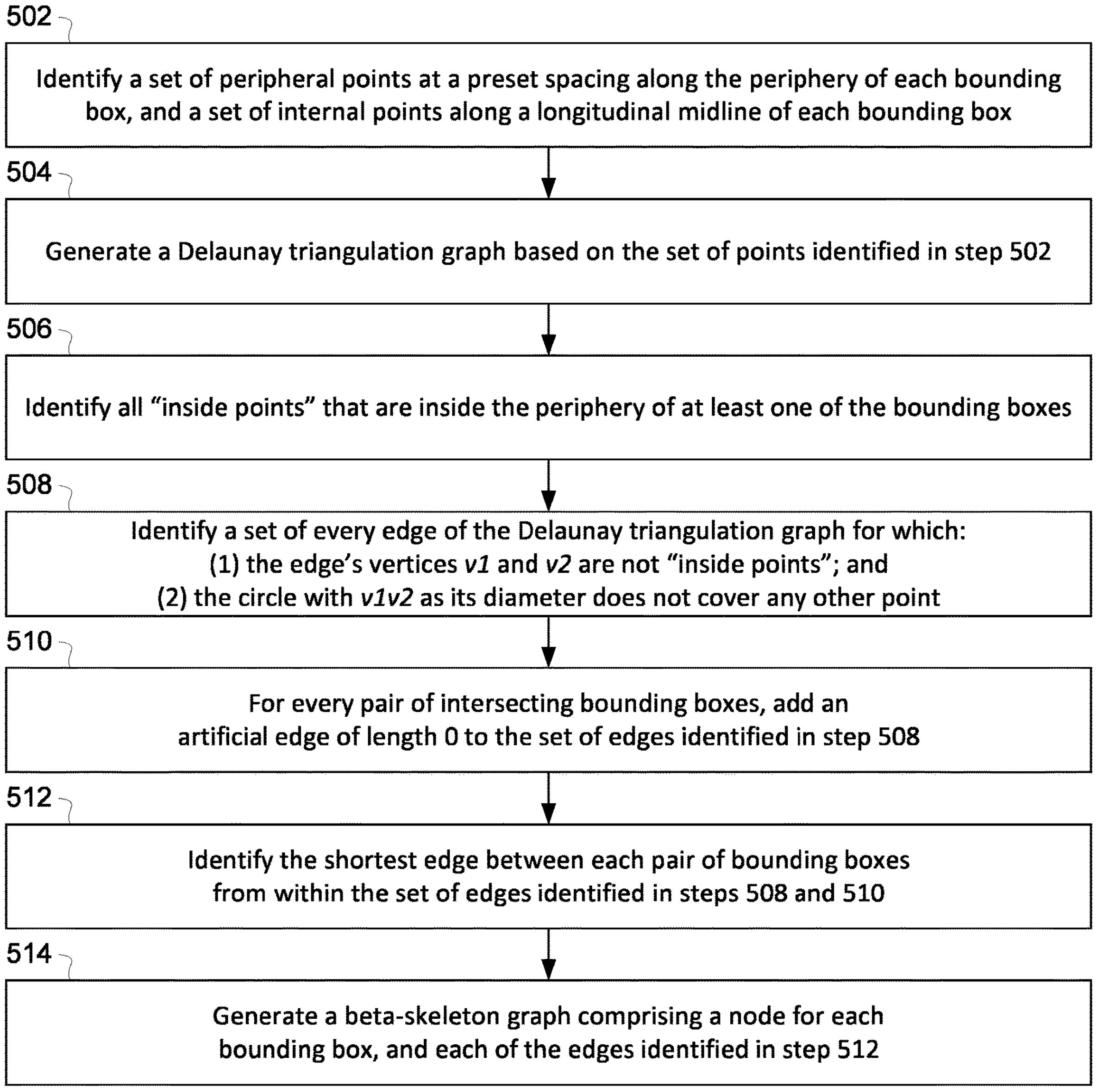
FIG. 5 depicts an exemplary method for generating a beta-skeleton graph from a set of bounding boxes, in accordance with aspects of the disclosure.

FIGS. 4 and 5 set forth a flow diagram 400 and exemplary method 500 showing how a set of bounding boxes A-D may be processed in order to generate an exemplary beta-skeleton graph.

In that regard, in step 502 of FIG. 5, the processing system (e.g., processing system 102) identifies a set of peripheral points at a preset spacing along the periphery of each bounding box, and a set of internal points along a longitudinal midline of each bounding box. FIG. 4 provides an illustrative example of how this might appear. In that regard, in block 402 of FIG. 4, the periphery of bounding box A is identified with reference numeral 404, one of the identified peripheral points of bounding box A is identified with reference numeral 406, and one of the internal points of bounding box A is identified with reference numeral 408.

In step 504 of FIG. 5, the processing system generates a Delaunay triangulation graph based on the set of the points identified in step 502. Although FIG. 4 does not show this intermediate step, as will be understood, a Delaunay triangulation graph based on block 402 of FIG. 4 would result in the points of bounding boxes A-D being interconnected such that no point will fall within the circumcircle of any triangle of the triangulation graph. There are many known approaches for generating Delaunay triangulations from a set of points, and the processing system may use any such approach.

In step 506 of FIG. 5, the processing system identifies all "inside points" that are inside the periphery of at least one of the bounding boxes. This will include not only the internal points that were originally identified in step 502, but also any peripheral points of one bounding box that may be inside the periphery of another bounding box by virtue of those two bounding boxes overlapping. For example, looking at block 402 of FIG. 4, point 410 will initially be identified in step 502 as being a peripheral point of bounding box B. However, point 410 will later be identified in step 506 as being an "inside point" by virtue of the fact that it falls within the periphery of bounding box A. All such inside points are shown in a light gray in block 402 (as well as in blocks 412 and 416).

The processing system may be configured to identify these "inside points" in any suitable way. For example, in some aspects of the technology, the processing system may be configured to traverse each "edge" (link) of the Delaunay triangulation graph that happens to start with a peripheral point of a given bounding box and extends inside of the given bounding box, as the end points of any such edges will by definition be points within one of the bounding boxes.

In step 508 of FIG. 5, the processing system identifies a set of every edge of the Delaunay triangulation graph for which: (1) the edge's vertices v1 and v2 are not "inside points"; and (2) the circle with v1v2 as its diameter does not cover any other point. Block 412 of FIG. 4 provides an illustrative example of how this might appear, with edges 414 and 416 representing two of the 16 edges that would be identified according to step 508. As can be seen, there are no edges in block 412 between bounding boxes B and C, or between bounding boxes A and D, as every possible connection between the points of those bounding boxes would end up creating circles which overlap at least one other point.

Here as well, the processing system may be configured to identify these edges in any suitable way. For example, based on the fact that the point closest to v1v2 will always be a neighbor of either v1 or v2 (based on the properties of Delaunay triangulation graphs), the processing system may be configured to determine whether a circle with diameter v1v2 will cover any points by simply checking whether the neighbors of v1 and v2 will fall within the circle with v1v2 as its diameter.

In step 510 of FIG. 5, for every pair of intersecting bounding boxes, the processing system adds an artificial edge of length 0 to the set of edges identified in step 508. In the example of FIG. 4, such an edge would be identified between intersecting bounding boxes A and B. However, since the edge is artificial (in that it doesn't actually correspond to an edge of the Delaunay triangulation graph), it has not been visually represented in block 412.

Although step 510 follows step 508 in exemplary method 500, it will be understood that the order of these processes may also be reversed. Thus, in some aspects of the technology, the processing system may first initialize the set of edges by adding 0-length edges for all intersecting bounding boxes, and then augment that set of edges with those identified from the beta-skeleton graph as discussed above with respect to step 508.

In step 512 of FIG. 5, the processing system identifies the shortest edge between each pair of bounding boxes from within the set of edges identified in steps 508 and 510. Block 418 of FIG. 4 provides an illustrative example of how this might appear, with edge **420*a* being the shortest edge between bounding boxes A and C, edge 420*b* being the shortest edge between bounding boxes B and D, and edge 420*c* being the shortest edge between bounding boxes C and D. In addition, although block 412 shows an edge 416 between bounding boxes A and B, the edge with the shortest distance between these boxes will be the artificial edge of length 0 that was identified in step 510. Although this artificial edge is not visually represented in block 418, it is represented in the resulting beta-skeleton graph shown in block 422**.

In step 514 of FIG. 5, the processing system generates a beta-skeleton graph comprising a node for each bounding box, and each of the edges identified in step 512. Block 422 of FIG. 4 provides an illustrative example of how this might appear, showing an exemplary beta-skeleton graph in which bounding box A is represented with node **424*a*, bounding box B is represented with node 424*b*, bounding box C is represented with node 424*c*, and bounding box D is represented with node 424*d*. In addition, nodes 424*a* and 424*c* are connected with edge 420*a* (as also shown in block 418), nodes 424*c* and 424*d* are connected with edge 420*c* (as also shown in block 418), nodes 424*d* and 424*b* are connected with edge 420*b* (as also shown in block 418), and nodes 424*a* and 424*b* are connected with edge 426. Further, in the exemplary beta-skeleton graph of block 422, a length for each edge of the beta-skeleton graph is shown next to each edge. Thus, as can be seen, edge 420*a* has a length of 1, edge 420*b* has a length of 2.5, edge 420*c* has a length of 1.1, and edge 426** has a length of 0 (since it is an artificial edge identified based on the overlapping of bounding boxes A and B). Although these edge lengths are shown pictorially for purposes of illustration, in practice they may simply be encoded into the data structure representing the beta-skeleton graph, for example as part of edge embeddings.

Figure 6:
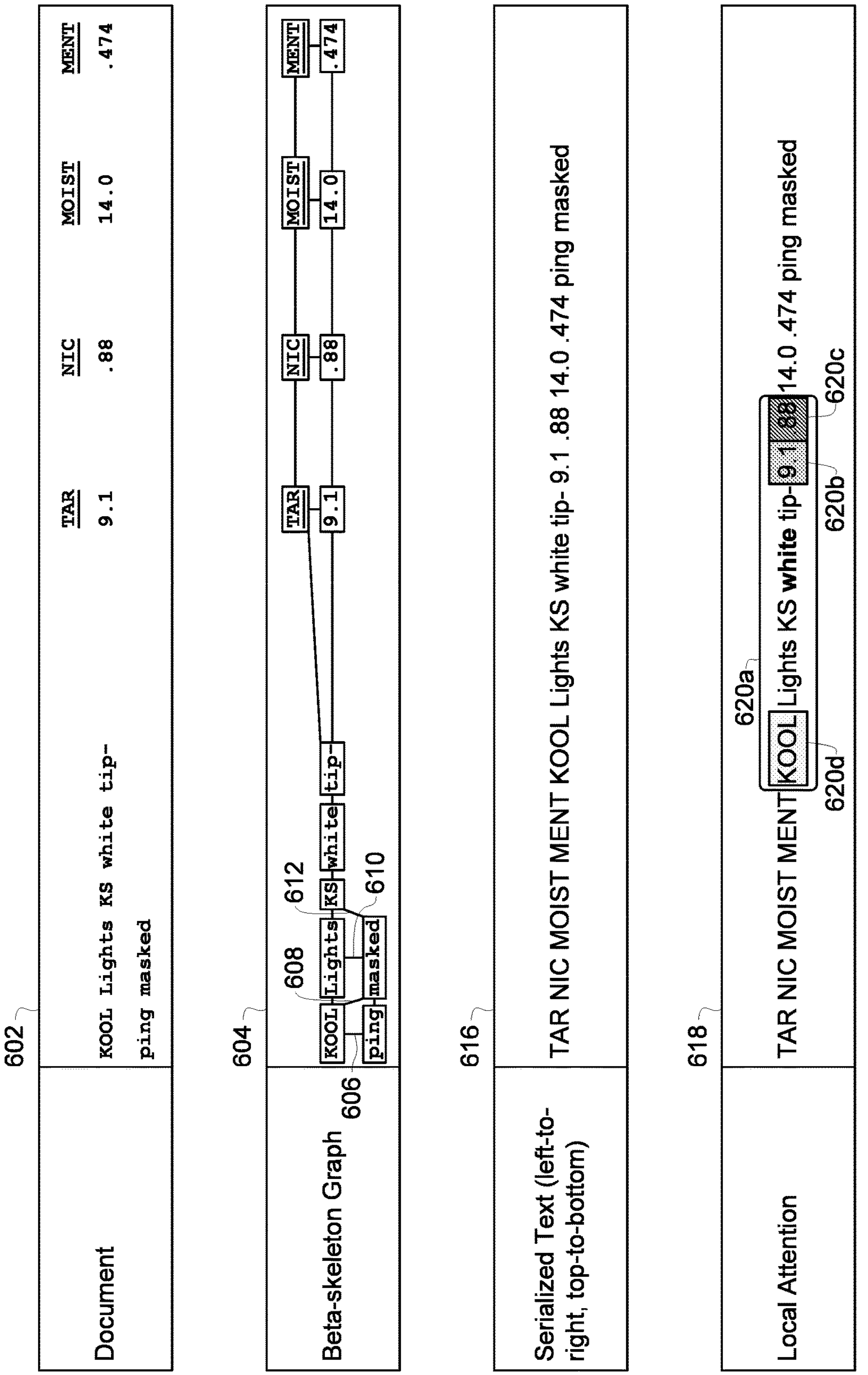
FIG. 6 depicts an exemplary portion of a document, a corresponding exemplary beta-skeleton graph, an exemplary serialized version of the text of the document, and an illustration of how local attention scores may be adjusted based on differences between predicted and actual values of the order and distance between the attender and attendee tokens, in accordance with aspects of the disclosure.

FIG. 6 depicts an exemplary portion of a document, a corresponding exemplary beta-skeleton graph, an exemplary serialized version of the text of the document, and an illustration of how local attention scores may be adjusted based on differences between predicted and actual values of the order and distance between the attender and attendee tokens, in accordance with aspects of the disclosure.

In that regard, box 602 depicts a portion of original text as it would appear in a given exemplary document, and box 604 depicts an exemplary beta-skeleton graph overlaying that original text. This beta-skeleton graph may be generated as described above with respect to FIGS. 3-5.

Box 616 depicts a serialized version of the text of box 602. In this example, the original text has been serialized using a simple left-to-right, top-to-bottom approach. In this way, box 616 helps to illustrate some of the issues that can arise from imperfect serialization. For example, the serialization approach shown in box 616 results in the column headings "TAR," "NIC," "MOIST," and "MENT" immediately preceding the first word of the second line ("KOOL"), despite the column headings being very far from "KOOL" in the original text shown in box 602. Likewise, the column headings are all at least five words removed from the values "9.1," "0.88," "14.0," and "0.474," despite those values being listed directly beneath each of the column headings in the original text shown in box 602. Similarly, this serialization approach results in "tip-" being immediately followed by the values "9.1," "0.88," "14.0," and "0.474," despite there being a substantial gap between them in the original text shown in box 602. This further results in the hyphenated partial word "tip-" being five words removed from its intended suffix ("ping"), despite "ping" being closer to "tip-" than are values "9.1," "0.88," "14.0," and "0.474" in the original text shown in box 602.

Box 618 illustrates how these types of serializing issues can present challenges for a transformer that employs a sparse global-local attention paradigm. In addition, box 618 also illustrates how these issues may be mitigated by basing local attention scores (e.g., for "long-long" pairings in ETC and BigBird) at least in part on the difference between predicted and actual values of the order and distance between the attender and attendee tokens (e.g., using a "Rich Attention" paradigm, as described below with respect to FIG. 7).

In that regard, window 620*a* represents an exemplary three-word local attention radius around an attender token for the word "white." As can be seen, this local attention radius will result in the transformer generating local attention weights between the token for "white" and the tokens for "KOOL," "Lights," KS," "tip-," "9.1," and "0.88." Thus, this three-word local attention radius will prevent the transformer from assessing attention between "white" and the tokens for "ping" and "masked," even though those words are within three words of "white" according to the proper reading order of the original document (as shown in box 602). Likewise, this local attention paradigm will result in the transformer assessing attention between "white" and the tokens for "9.1" and "0.88" even though the word "white" is farther away from "9.1" and "8.8" in the original document than it is from "ping" and "masked" in the original document.

Windows 620*b*-620*d* illustrate how attention scores for the tokens within window 620*a* may be modified using "Rich Attention" or a similar order- and distance-based adjustment paradigm. In that regard, the transformer may be configured to generate predictions for each pair of attender and attendee tokens which represent the "ideal" order that those tokens would be in relative to one another, and the "ideal" distance those tokens would be from one another, if it is assumed that the attender and attendee tokens do indeed relate to each other in some way. In FIG. 7, these predictions are made by learned parametric functions 708 and 712, but the transformer may generate "ideal" order and distance predictions in any suitable way (e.g., blocks 720 and 724 of FIG. 7). The transformer may then compare the actual order of the attender and attendee token (e.g., block 718 of FIG. 7) to the predicted "ideal" order to generate a first error value (e.g., block 730 of FIG. 7), and may compare the actual distance between the attender and attendee token (e.g., block 722 of FIG. 7) to the predicted "ideal" distance to generate a second error value (e.g., block 732 of FIG. 7). These error values may then be used to modify an initial pre-SoftMax attention score that the transformer generates between the attender and attendee token based on a typical query-key approach.

In some aspects of the technology, and as shown and described below with respect to FIG. 7, the transformer may use the error values to penalize the attention scores of those token pairs that have an actual order and/or distance that is different than their "ideal" order and/or distance, thus tending to decrease unwarranted attention between tokens that are in fact out of order and/or spatially distant from one another in the original document. However, in some aspects of the technology, the transformer may instead (or in addition) be configured to amplify the attention scores of those token pairs that have an actual order and/or distance that is close to their "ideal" order and/or distance, thus tending to increase warranted attention between tokens that are in fact close and/or logically ordered in the original document.

Returning now to the example shown in box 618 of FIG. 6, it has been assumed that the ideal order and/or distance between the token for "white" and the token for "9.1" will be different than the actual order and distance between "white" and "9.1" in the original document, and thus that the attention score between "white" and "9.1" will be reduced based on these differences. For example, this may result from the transformer predicting that the "ideal" distance between "white" and "9.1" (if they were related) would be much closer than how those words are actually spaced in the original document, and thus that the attention score should be reduced to some degree based on this difference. Likewise, this may result from the transformer predicting that the "ideal" order between "white" and "9.1" would be for "9.1" to precede "white" rather than follow it (as is the case in the text of the original document), and thus that the attention score should be reduced to some other degree based on this difference.

Similarly, it has been assumed that the model's predictions will result in reductions of the attention scores between "white" and "0.88," and between "white" and "KOOL," but by different amounts. These varying amounts of attention score reductions are visually represented in FIG. 6 by boxes 620*b*, 620*c*, and 620*d* having different levels of shading.

In contrast, because the token for the word "KS" is both related to and spatially close to the token for "white" in the original text, it has been assumed that there will be little or no difference between how these tokens are actually ordered and spaced in the original document and the model's learned prediction of the "ideal" order and spacing. As such, in this example, it is assumed that there will be little or no change made to the attention score that the transformer would otherwise generate between "white" and "KS." For the same reason, it has been assumed that there will be little or no changes to the attention scores that the transformer would otherwise generate between "white" and "Lights" and between "white and "tip-."

Thus, although the detrimental impact of imperfect serializing may be amplified where a sparse global-local attention paradigm is employed, the potential for the model to reach false conclusions based on improperly serialized tokens may be effectively and efficiently managed by adjusting local attention scores based on differences between predicted and actual values of the order and distance between the attender and attendee tokens, as illustrated in box 618.

In addition, because the transformers of the present technology may be configured to accept supertokens as their initial input, spatial and semantic information regarding a given token's neighbors will automatically be weighed in the first layer of the transformer's attention mechanism even where imperfect serializing and/or the size of the local attention radius would prevent attention from being directly assessed between a given token and one or more of its neighboring tokens from the beta-skeleton graph. Thus, for example, although the local attention radius illustrated with box 620*a* will prevent the transformer from directly assessing attention between the token for "white" and the token for "ping," the transformer will end up implicitly assessing attention between "white" and "ping" because the beta-skeleton vector for "ping" will propagate into the supertoken for "KOOL" through edge 606. Likewise, although attention will not be directly assessed between the token for "white" and the token for "masked," the transformer will end up implicitly assessing attention between "white" and "masked" because the beta-skeleton vector for "masked" will propagate into the supertokens for "KOOL," "Lights," and "KS" through edges 608, 610, and 612, respectively.

Although the examples of FIGS. 3 and 7 both involve a transformer that is configured to both take supertokens as input, and to adjust local attention scores based on the order and distance between attender and attendee supertokens (as discussed above and below), these features may also be used separately. In that regard, although a combined approach as shown in FIGS. 3 and 7 may provide the biggest improvements over sequence models based on transformers with standard global-local sparse attention paradigms, significant benefits may be possible from using only supertokens, or only the attention-adjustment paradigms discussed herein.

Figure 7:
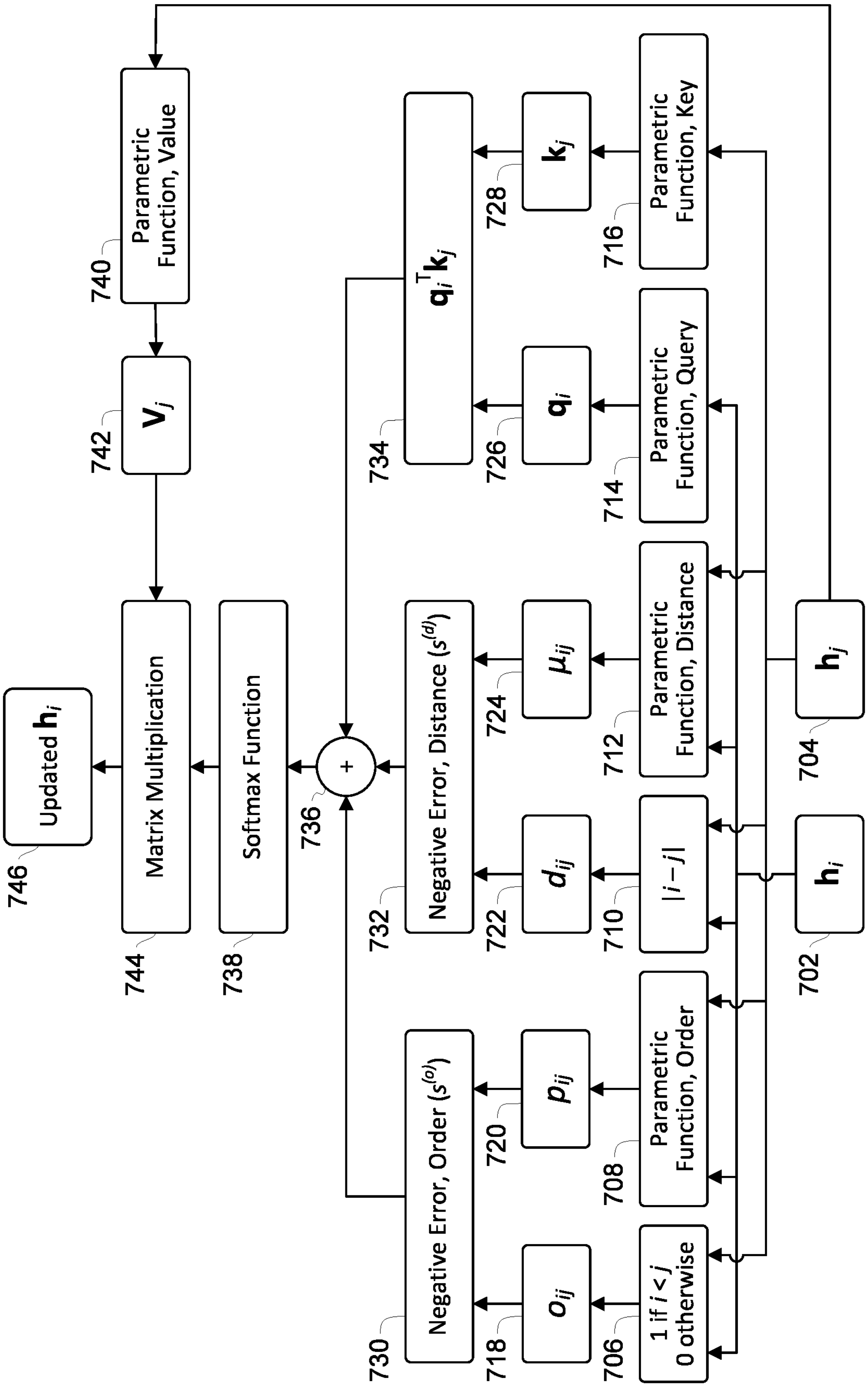
FIG. 7 is a flow diagram illustrating how an attention head of a transformer may employ a "Rich Attention" paradigm, in accordance with aspects of the disclosure.

FIG. 7 shows a flow diagram 700 illustrating how an attention head of a transformer may employ a "Rich Attention" paradigm, in accordance with aspects of the disclosure. As used herein, the term "Rich Attention" is not meant to identify a paradigm that is an alternative to sparse attention, nor are "Rich Attention" and sparse attention mutually exclusive. Rather, the term "rich" in "Rich Attention" is simply meant to indicate that the attention score between a given attender and attendee token will be influenced or "enriched" based on how closely the actual order and distance between those supertokens matches a predicted "ideal" order and distance for those supertokens. In this way, "Rich Attention" can be used to enrich any type of attention score, including local attention scores calculated according to a sparse global-local attention paradigm (e.g., as used in ETC and BigBird transformers), as well as attention scores calculated according to standard attention paradigms (e.g., as used in BERT transformers).

In the example of FIG. 7, the input to the attention head are two vectors $h_i$ (box 702) and $h_j$ (box 704). In the first layer of the transformer, vectors $h_i$ and $h_j$ will be the supertokens for two nodes i and j of a beta-skeleton graph generated from an input document, as discussed above with respect to FIGS. 3-5. For each successive layer, vectors $h_i$ and $h_j$ will be based on outputs of the previous layer. For clarity, the elements of flow diagram 700 will each be described below using the assumption that processing is taking place in the first layer of the transformer, and thus that vectors $h_i$ and $h_j$ are the supertokens for nodes i and j. Further, in all cases, it will be assumed that vector $h_i$ is the attender and vector $h_j$ is the attendee.

In the example of FIG. 7, the transformer is configured to adjust attention scores based on how closely the actual order and distance between those supertokens matches a predicted "ideal" order and distance for those supertokens. To do this, the transformer will generate four values: (1) an actual order value $o_{ij}$ representing an actual order between tokens i and j (box 718); (2) an "ideal" order value $p_{ij}$ representing the model's prediction of what order tokens i and j should be in if that they are related to one another (box 720); (3) an actual distance value $d_{ij}$ representing an actual distance between tokens i and j (box 722); and (4) an "ideal" distance value $\mu_{ij}$ representing the model's prediction of what the distance should be between tokens i and j if they are related to one another (box 724). As can be seen from the arrows of extending from $h_i$ and $h_j$ in flow diagram 700, each of these values will be calculated based at least in part on $h_i$ and $h_j$. The individual details of functions 706, 708, 710, and 712 will be discussed further below.

In that regard, in the example of FIG. 7, the actual order value $o_{ij}$ (box 718) is based on the indices i and j of vectors $h_i$ and $h_j$. Specifically, as shown in box 706, the transformer will compare i to j, and will assign a value of 1 if i is greater than j, and will otherwise assign a value of 0. Any suitable manner of indexing $h_i$ and $h_j$ may be used in this regard. For example, indices i and j may be the coordinates of bounding boxes surrounding tokens i and j, coordinates of the center points of the bounding boxes surrounding tokens i and j, coordinates of a common corner of the bounding boxes surrounding tokens i and j, etc. Likewise, any suitable manner of ordering $h_i$ and $h_j$ may be used. Thus, in some aspects of the technology, the actual order value of may represent the order of tokens i and j along a single axis or path (e.g., along the x-axis of the document, along the y-axis of the document, along a straight or curved line corresponding to the text direction in the relevant portion of the document, etc.). Likewise, in some aspects of the technology, the actual order value of may represent the order of tokens i and j along two axes (e.g., $o_{ij}$ may be a vector with values corresponding to how i and j are ordered in the x-axis, and in the y-axis).

In the example of FIG. 7, the ideal order value $p_{ij}$ (box 720) is generated based on vectors $h_i$ and $h_j$ using a learned parametric function 708. Any suitable parametric function may be used in this regard. For example, in some aspects of the technology, the transformer may use a sigmoid classifier trained to predict the probability of the ordering of tokens, such as shown in Equation 1 below:

$$p_{ij} = \text{Sigmoid}\left(\text{affine}^{(o)}([h_i; h_j])\right) \tag{1}$$

In Equation 1, $\text{affine}^{(o)}(x)$ represents $W^{(o)}x+b^{(o)}$ where $W^{(o)}$ is a weight matrix of free parameters, and $b^{(o)}$ is a bias vector composed of free parameters. The free parameters of $W^{(o)}$ and $b^{(o)}$ may be randomly initialized and then updated as the sequence model is trained. In that regard, the sigmoid classifier may be trained to minimize cross-entropy loss, or may be trained using any other suitable loss function.

The actual distance value $d_{ij}$ (box 722) is also based on the indices i and j of vectors $h_i$ and $h_j$. Specifically, as shown in box 710, the transformer will find the absolute value of i minus j. As mentioned above, any suitable manner of indexing and comparing $h_i$ and $h_j$ may be used in this regard. Thus, in some aspects of the technology, the actual distance value $d_{ij}$ may be based on distance measured along a single axis or path (e.g., along the x-axis of the document, along the y-axis of the document, along a straight or curved line corresponding to the text direction in the relevant portion of the document, etc.). Likewise, in some aspects of the technology, the actual distance value $d_{ij}$ may be based on distances measured along two axes (e.g., $d_{ij}$ may be a vector with values corresponding to how far token i is from token j along both the x-axis and the y-axis, or may be a value representing the absolute straight-line distance between token i and token j).

In the example of FIG. 7, the ideal distance value $\mu_{ij}$ (box 724) is generated based on vectors $h_i$ and $h_j$ using another learned parametric function 712. Here as well, any suitable parametric function may be used in this regard. For example, in some aspects of the technology, the transformer may use an affine transformation, such as shown in Equation 2 below:

$$\mu_{ij} = \text{affine}^{(d)}([h_i; h_j]) \tag{2}$$

In Equation 2, $\text{affine}^{(d)}(x)$ represents $W^{(d)}x+b^{(d)}$ where $W^{(d)}$ is a weight matrix of free parameters, and $b^{(d)}$ is a bias vector composed of free parameters. Like $W^{(o)}$ and $b^{(o)}$, the free parameters of $W^{(d)}$ and $b^{(d)}$ may also be randomly initialized and then updated as the sequence model is trained. In that regard, the affine transformation may be trained to minimize an $L_2$ loss, or may be trained using any other suitable loss function.

As shown in box 730, the actual order value $o_{ij}$ (box 718) and ideal order value $p_{ij}$ (box 720) will be used to generate a negative error value $s^{(o)}$. In some aspects of the technology, negative error value $s^{(o)}$ may be calculated using a negative sigmoid cross entropy loss, such as shown in Equation 3 below.

$$s^{(o)} = o_{ij}\ln(p_{ij}) + (1 - o_{ij})(1 - \ln(p_{ij})) \tag{3}$$

However, negative error value $s^{(o)}$ may be calculated using any negative log-likelihood function or other suitable equation that is likewise based on a comparison of, or difference between, the actual order value $o_{ij}$ and the ideal order value $p_{ij}$.

Likewise, as shown in box 732, the actual distance value $d_{ij}$ (box 722) and ideal distance value $\mu_{ij}$ (box 724) will be used to generate a negative error value $s^{(d)}$. In some aspects of the technology, negative error value $s^{(d)}$ may be calculated using a scaled negative $L_2$ loss, such as shown in Equation 4 below.

$$s^{(d)} = -\frac{t^2(\ln(1 + d_{ij}) - \mu_{ij})^2}{2} \tag{4}$$

In Equation 4, the variable t represents a free parameter that will be randomly initialized and updated as the sequence model is trained. However, negative error value $s^{(d)}$ may be calculated using any negative log-likelihood function or other suitable equation which is based on a comparison of, or difference between, the actual distance value $d_{ij}$ and ideal distance value $\mu_{ij}$. Likewise, in some aspects of the technology, instead of being a constant, t may be a variable value. For example, in some aspects, t may be the output of another affine transformation that takes vectors $h_i$ and $h_j$ as input.

Although the example of FIG. 7 assumes that the actual order value $o_{ij}$ (box 718), ideal order value $p_{ij}$ (box 720), actual distance value $d_{ij}$ (box 722), and ideal distance value $\mu_{ij}$ (box 724) will all be generated based directly on vectors $h_i$ and $h_j$, they may also be indirectly based on vectors $h_i$ and $h_j$. For example, each of these values may instead be generated using the reduced-rank query and key vectors $q_i$ (box 726) and $k_j$ (box 728). In such an arrangement, vectors $h_i$ and $h_j$ would be initially provided to parametric functions 714 and 716 to generate the query and key vectors $q_i$ and $k_j$, and then $q_i$, and $k_j$ would be fed to functions 706, 708, 710, and 712 in order to generate the actual order value $o_{ij}$, ideal order value $p_{ij}$, actual distance value $d_{ij}$, and ideal distance value $\mu_{ij}$.

Regardless of the approach used for calculating the actual order value $o_{ij}$, ideal order value $p_{ij}$, actual distance value $d_{ij}$, and ideal distance value $\mu_{ij}$, vectors $h_i$ and $h_j$ will be provided to the learned parametric functions 714 and 716 to generate query and key vectors $q_i$ (box 726) and $k_j$ (box 728). These learned parametric functions 714 and 716 will both be separate affine transformations, each with their own weight matrix and bias vector. As discussed above, each such weight matrix and bias vector may be randomly initialized and then updated as the sequence model is trained. The resulting the query and key vectors $q_i$ and $k_j$, will then be subjected to matrix multiplication (function 734) to generate an initial pre-SoftMax attention score. Specifically, as shown in FIG. 7, the transformer will calculate a dot product of the transpose of query vector $q_i$ and the key vector $k_j$. The resulting initial pre-SoftMax attention score will be added to the negative error values 730 and 732 to generate an adjusted pre-SoftMax attention score, as shown in the circle labeled with reference numeral 736. That adjusted pre-SoftMax attention score will then be provided to SoftMax Function 738.

The remaining steps of flow diagram 700 are consistent with traditional attention processing. In that regard, vector $h_j$ is provided to a learned parametric function 740 to generate a value vector $V_j$ (box 742). The post-SoftMax attention score produced by SoftMax Function 738 is then multiplied by the value vector $V_j$ as shown in box 744, resulting in an updated vector $h_i$ as shown in box 746. As discussed above, this updated vector $h_i$ may then be used in successive layers of the transformer consistent with standard transformer architecture. Finally, the outputs of the last layer of the transformer will be used to generate the BIOES logits described above with respect to FIG. 3.

The structure-aware sequence models of the present technology may be trained in any suitable way. In that regard, in some aspects of the technology, a structure-aware sequence model may be pretrained using one more sets of masked-language modeling tasks, and/or next-sentence prediction tasks, and may be fine-tuned using one or more annotated sets of training examples (e.g., the public FUNSD and/or CORD datasets). Likewise, in some cases, pretraining may not be deemed necessary, and the structure-aware sequence model may be trained from scratch using only annotated sets of training examples.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A processing system comprising:

a memory storing a neural network comprising a graph convolutional network and a transformer; and one or more processors coupled to the memory and configured to classify text from a given document, comprising:

generating a beta-skeleton graph based on a plurality of tokens, each given token of the plurality of tokens corresponding to a given string of text in the given document, and wherein the beta-skeleton graph comprises, for each given token:

a node corresponding to the given token and comprising a vector based on content and location of the given string of text within the given document;

one or more edges, each edge of the one or more edges linking the node corresponding to the given token to a neighboring node corresponding to another token of the plurality of tokens; and an edge embedding for each edge based on a spatial relationship comprising at least one of vertical distance, horizontal distance, or aspect ratio between the tokens;

generating, using the graph convolutional network, a plurality of supertokens based on the beta-skeleton graph, each given supertoken of the plurality of supertokens being based at least in part on the vector of a given node and the vector of each neighboring node to which the given node is linked via one of its one or more edges, and further based on the edge embedding of each corresponding edge, wherein the plurality of supertokens preserves local syntactic information independently of document serialization;

generating, using the transformer, a plurality of predictions based on the plurality of supertokens; and generating a set of classifications based on the plurality of predictions, the set of classifications identifying at least one entity class corresponding to at least one token of the plurality of tokens.

2. The processing system of claim 1, wherein generating the plurality of predictions based on the plurality of supertokens using the transformer comprises, for a given attender supertoken and a given attendee supertoken:

generating a first prediction regarding how the given attender supertoken and given attendee supertoken should be ordered if the given attender supertoken and given attendee supertoken are related to one another;

generating a second prediction regarding how far the given attender supertoken should be from the given attendee supertoken if the given attender supertoken and given attendee supertoken are related to one another;

generating a first error value based on the first prediction and a value based on how text corresponding to the given attender supertoken and given attendee supertoken is actually ordered in the given document;

generating a second error value based on the second prediction and a value based on how far text corresponding to the given attender supertoken actually is from text corresponding to the given attendee supertoken in the given document;

generating a query vector based on the given attender supertoken;

generating a key vector based on the given attendee supertoken;

generating a first attention score based on the query vector and the key vector; and generating a second attention score based on the first attention score, the first error value, and the second error value.

3. The processing system of claim 1, wherein the edge embedding comprises, for each given token:

a given edge embedding corresponding to each given edge of the one or more edges, the given edge embedding being based on the spatial relationship in the given document between the given token and a token corresponding to the neighboring node to which the given edge is linked.

4. The processing system of claim 1, wherein the transformer is configured to use a sparse global-local attention paradigm.

5. The processing system of claim 4, wherein the transformer is based on an Extended Transformer Construction architecture.

6. The processing system of claim 1, wherein the given document comprises an image of a document, and wherein the one or more processors are further configured to identify, for each given token of the plurality of tokens, the content and location of the given string of text in the given document to which the given token corresponds.

7. The processing system of claim 6, wherein identifying the content and location of the given string of text in the given document comprises using optical character recognition.

8. The processing system of claim 1, wherein generating the set of classifications based on the plurality of predictions comprises performing dynamic processing based on the plurality of predictions.

9. The processing system of claim 1, wherein the set of classifications based on the plurality of predictions are BIOES (Begin, Inside, Outside, End, Single) classifications.

10. The processing system of claim 9, wherein generating the set of classifications based on the plurality of predictions comprises performing dynamic processing based on the plurality of predictions to determine a Viterbi path representing an optimal combination of BIOES types and entity classes that generates the highest overall probability based on the plurality of predictions.

11. A processing system comprising:

a memory storing a neural network comprising a transformer; and one or more processors coupled to the memory and configured to classify text from a given document, comprising:

generating a beta-skeleton graph based on a plurality of tokens, wherein the beta-skeleton graph comprises, for each given token of the plurality of tokens:

a node corresponding to the given token and comprising a vector based on content and location of a given string of text within the given document; and one or more edges, each edge of the one or more edges linking the node corresponding to the given token to a neighboring node corresponding to another token of the plurality of tokens; and an edge embedding for each edge based on a spatial relationship comprising at least one of vertical distance, horizontal distance, or aspect ratio between the tokens;

generating, using a graph convolutional network, a plurality of supertokens based on the beta-skeleton graph, wherein the plurality of supertokens preserves local syntactic information independently of document serialization, each given supertoken of the plurality of supertokens being based at least in part on the vector of a given node and the vector of each neighboring node to which the given node is linked via one of its one or more edges generating, using a transformer, a plurality of predictions based on the plurality of tokens, each given token of the plurality of tokens corresponding to the given string of text in the given document, and wherein generating a given prediction of the plurality of predictions for a given attender token and a given attendee token of the plurality of tokens comprises:

generating a first prediction regarding how the given attender token and given attendee token should be ordered if the given attender token and given attendee token are related to one another;

generating a second prediction regarding how far the given attender token should be from the given attendee token if the given attender token and given attendee token are related to one another;

generating a first error value based on the first prediction and a value based on how the text corresponding to the given attender token and given attendee token is actually ordered in the given document;

generating a second error value based on the second prediction and a value based on how far the text corresponding to the given attender token actually is from the text corresponding to the given attendee token in the given document;

generating a query vector based on the given attender token;

generating a key vector based on the given attendee token;

generating a first attention score based on the query vector and the key vector;

generating a second attention score based on the first attention score, the first error value, and the second error value; and generating the given prediction based at least in part on the second attention score; and generating a set of classifications based on the plurality of predictions, the set of classifications identifying at least one entity class corresponding to at least one token of the plurality of tokens.

12. The processing system of claim 11, wherein the neural network further comprises the graph convolutional network, and wherein, for each given prediction of the plurality of predictions that is generated by the transformer, the given attender token and the given attendee token are each a supertoken of the plurality of supertokens.

13. The processing system of claim 12, wherein the edge embedding comprises, for each given token:

a given edge embedding corresponding to each given edge of the one or more edges, the given edge embedding being based on the spatial relationship in the given document between the given token and a token corresponding to the neighboring node to which the given edge is linked.

14. The processing system of claim 11, wherein the transformer is configured to use a sparse global-local attention paradigm.

15. The processing system of claim 14, wherein the transformer is based on an Extended Transformer Construction architecture.

16. The processing system of claim 11, wherein the given document comprises an image of a document, and wherein the one or more processors are further configured to identify, for each given token of the plurality of tokens, the content and location of the given string of text in the given document to which the given token corresponds.

17. The processing system of claim 16, wherein identifying the content and location of the given string of text in the given document comprises using optical character recognition.

18. The processing system of claim 11, wherein generating the set of classifications based on the plurality of predictions comprises performing dynamic processing based on the plurality of predictions.

19. The processing system of claim 11, wherein the set of classifications based on the plurality of predictions are BIOES (Begin, Inside, Outside, End, Single) classifications.

20. The processing system of claim 19, wherein generating the set of classifications based on the plurality of predictions comprises performing dynamic processing based on the plurality of predictions to determine a Viterbi path representing an optimal combination of BIOES types and entity classes that generates the highest overall probability based on the plurality of predictions.

* * * * *